US011140913B2

(12) United States Patent
Tang et al.

(10) Patent No.: US 11,140,913 B2
(45) Date of Patent: Oct. 12, 2021

(54) MICROWAVE STERILIZATION OR PASTEURIZATION

(71) Applicant: WASHINGTON STATE UNIVERSITY, Pullman, WA (US)

(72) Inventors: Juming Tang, Pullman, WA (US); Fang Liu, Pullman, WA (US)

(73) Assignee: WASHINGTON STATE UNIVERSITY, Pullman, WA (US)

( * ) Notice: Subject to any disclaimer, the term of this patent is extended or adjusted under 35 U.S.C. 154(b) by 478 days.

(21) Appl. No.: 15/943,751

(22) Filed: Apr. 3, 2018

(65) Prior Publication Data

US 2018/0220682 A1 Aug. 9, 2018

Related U.S. Application Data

(63) Continuation of application No. 14/883,153, filed on Oct. 14, 2015, now Pat. No. 9,961,926, which is a
(Continued)

(51) Int. Cl.
*A23L 3/01* (2006.01)
*A23L 29/269* (2016.01)
(Continued)

(52) U.S. Cl.
CPC ............... *A23L 3/01* (2013.01); *A23L 29/272* (2016.08); *H05B 6/705* (2013.01); *H05B 6/707* (2013.01); *H05B 6/782* (2013.01); *H05B 6/802* (2013.01); *A23V 2002/00* (2013.01); *H05B 2206/044* (2013.01); *H05B 2206/045* (2013.01)

(58) Field of Classification Search
CPC ......... A23L 3/01; A23L 29/272; H05B 6/705; H05B 6/707; H05B 6/782; H05B 6/802; H05B 2206/044; H05B 2206/045; A23V 2002/00
See application file for complete search history.

(56) References Cited

U.S. PATENT DOCUMENTS 3,398,251 A   8/1968  Jeppson et al.
7,119,313 B2* 10/2006 Tang ................ H05B 6/701
                                            219/700
2005/0127068 A1  6/2005  Tang et al.

FOREIGN PATENT DOCUMENTS

WO    2009/017708 A2   2/2009

* cited by examiner

*Primary Examiner* — Steven N Leff
(74) *Attorney, Agent, or Firm* — W&C IP

(57) ABSTRACT

Various embodiments of processing systems and components for sterilization or pasteurization and associated methods of operation are described herein. For example, a method of sterilization or pasteurization includes immersing an item in an immersion fluid, and the immersed item is subject to a hydrostatic pressure of the immersion fluid. The method also includes applying microwave energy to the item while the item is immersed in the immersion fluid and subject to the hydrostatic pressure of the immersion fluid. The hydrostatic pressure of the immersion fluid prevents the water content of the item from causing steam explosion in the item while the microwave energy is applied. The method further includes heating the item immersed in the immersion fluid to a target temperature with the applied microwave energy, the target temperature being sufficient to achieve sterilization or pasteurization of the item.

5 Claims, 15 Drawing Sheets

Related U.S. Application Data continuation of application No. PCT/US2015/029468, filed on May 6, 2015.

(60) Provisional application No. 62/030,330, filed on Jul. 29, 2014, provisional application No. 61/990,066, filed on May 7, 2014.

(51) Int. Cl.
*H05B 6/80* (2006.01)
*H05B 6/70* (2006.01)
*H05B 6/78* (2006.01)

MICROWAVE STERILIZATION OR PASTEURIZATION

CROSS-REFERENCE TO RELATED APPLICATIONS

This application is a continuation application of U.S. Ser. No. 14/883,153 filed Oct. 14, 2015, now U.S. Pat. No. 9,961,926, which was a continuation of PCT/US2015/29468 filed May 6, 2015, which claimed priority to U.S. Provisional Application 62/020,330 filed Jul. 29, 2014 and U.S. Provisional Application 61/990,066 filed May 7, 2014.

STATEMENT REGARDING FEDERALLY FUNDED RESEARCH

This invention was made with governmental support under 2013-68003-20096 awarded by United States Department of Agriculture, under the National Institute of Food and Agriculture. The government has certain rights in this invention.

BACKGROUND

Sterilization or pasteurization has been used in preserving foods, preventing sepsis in humans or animals, and in other fields. For example, food products can be sterilized or pasteurized to reduce or eliminate fungi, bacteria, viruses, spore forms, or other harmful microbiological organisms that may cause spoilage or even food-borne diseases. One sterilization or pasteurization technique includes heating food products with hot air, hot water, or steam. Heating in such a manner, however, can result in poor taste, texture, color, or smell of the food products. Also, such heating technique can be energy inefficient and may require long processing time.

DETAILED DESCRIPTION

Various embodiments of processing systems, components, and compositions for sterilization or pasteurization and associated methods of operation are described herein. In the following description, specific details of systems, components, and operations are included to provide a thorough understanding of certain embodiments of the disclosed technology. A person skilled in the relevant art will also understand that the technology may have additional embodiments. The technology may also be practiced without several of the details of the embodiments described below with reference to FIGS. 1-11B.

As used herein, the term "sterilization" generally refers to a process that eliminates or removes all forms of fungi, bacteria, viruses, spore forms, or other microbiological organisms present in food products, medication, biological culture media, or other suitable items. Also used herein, the term "pasteurization" generally refers to a partial sterilization process in which microbiological organisms are partially but not completely eliminated or removed. The term "item" generally refers to any suitable article of manufacture that may be sterilized or pasteurized. Example items include, without limitation, food products, medical supplies, consumer products, and/or other suitable articles. The term "food product" generally refers to any food items suitable for human or animal consumption. Examples of a food product include, without limitation, packaged foods, canned foods, dairy products, beer, syrups, water, wines, and juices.

As discussed above, sterilization or pasteurization by heating food products with hot air, hot water, or steam may result in poor taste, texture, color, smell, or other adverse effects. During the heating process, a surface or exterior portion of the food products may be excessively heated in order to achieve a desired interior temperature. Such excessive heating is one factor that may cause the foregoing adverse effects in the food products. Several embodiments of the disclosed technology utilize microwave to heat items (e.g., a food product) immersed in an immersion fluid (e.g., tempered water) to sterilize or pasteurize the items. As discussed in more detail below, several embodiments of the disclosed technology requires less processing time than conventional techniques, and can produce repeatable and generally uniform temperature profiles in the items to achieve sterilization or pasteurization in an efficient and cost-effective manner.

Figure 1:
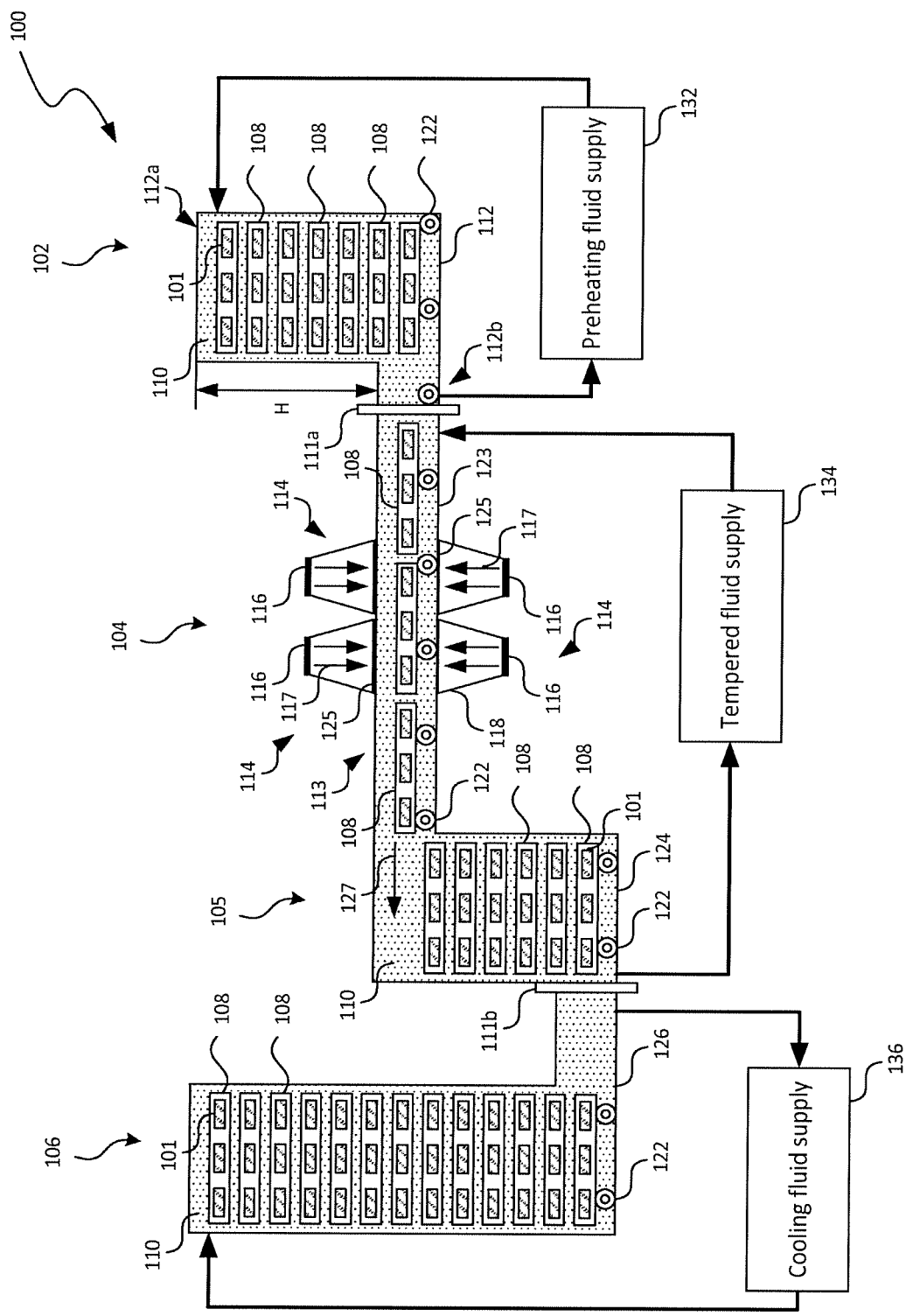
FIG. 1 is a schematic diagram illustrating a processing system useful for sterilization or pasteurization in accordance with embodiments of the disclosed technology.

FIG. 1 is a schematic diagram illustrating a processing system 100 useful for sterilization or pasteurization of items 101 (e.g., a food product) contained in transport carriers 108 in accordance with embodiments of the disclosed technology. As shown in FIG. 1, the processing system 100 can include a preheating section 102, a heating section 104, and a cooling section 106 (collectively referred to as "sections") coupled to one another in series. In the illustrated embodiment, the processing system 100 also includes an optional holding section 105 between the heating section 104 and the cooling section 106. In other embodiments, the optional holding section 105 may have other suitable configurations, one example of which is described in more detail below with reference to FIG. 6. In further embodiments, the holding section 105 may be eliminated. Even though certain components or sections are illustrated in FIG. 1, the processing system 100 can also include additional and/or different components. For example, the processing system 100 can also include a process logic controller, pneumatic lifts, strainers, filters, sensors (e.g., level sensors, flow meters, pressure gauges, etc.), and/or other suitable mechanical/electrical components.

As shown in FIG. 1, the sections may be configured to circulate and/or hold an immersion fluid 110. In certain embodiments, the immersion fluid 110 can include water, and one or more of the sections may be coupled to a corresponding fluid supplies. For example, the preheating section 102 can be coupled to a preheating fluid supply 132. The cooling section 106 is coupled to a cooling fluid supply 136. In the illustrated embodiment, the heating section 104 and the optional holding section 105 are both coupled to a tempered fluid supply 134. In other embodiments, the heating section 104 and the optional holding section 105 may each be coupled to a corresponding tempered fluid supplies (not shown).

Each of the fluid supplies 132, 134, and 138 can be configured to provide and circulate the immersion fluid 110 at an operating temperature. For example, in certain embodiments, the preheating fluid supply 132 can provide and circulate the immersion fluid 110 at a temperature approximately equal to or above a preheating temperature (e.g., 60° C.) of the items 101 in the preheating section 102. The tempered fluid supply 134 can provide and circulate the immersion fluid 110 at a temperature approximately equal to or above a desired heating temperature (e.g., 90° C.) of the items 101 in the heating section 104. The preheating temperature is generally lower than the heating temperature in the heating section 104. Examples of the heating fluid supply 132, tempered fluid supply 134, and the cooling fluid supply 136 are described in more detail below with reference to FIGS. 5A-5C, respectively. In other embodiments, the immersion fluid 110 may also include fat, oil, polymeric solvents, and/or other suitable fluid in liquid or semi-liquid form.

Also shown in FIG. 1, one or more dividers 111 (shown individually as first divider 111a and second divider 111b) may be configured to controllably isolate the immersion fluid 110 between adjacent sections while allowing the transport carriers 108 to pass through. For example, in the illustrated embodiment, the first divider 111a can controllably isolate the immersion fluid 110 between the preheating section 102 and the heating section 104. The second divider 111b can controllably isolate the immersion fluid 110 between the heating section 104 (and optional holding section 105) and the cooling section 106. In other embodiments, the processing system 100 can also include additional and/or different placement of dividers 111. For example, an additional divider (not shown) may be between the heating section 104 and the holding section 105.

The one or more dividers 111 can each include suitable mechanical and/or electrical components configured to at least partially seal the immersion fluid 110 from flowing to adjacent sections. For example, in one embodiment, a divider 111 can include a pretension door constructed from a flexible material (e.g., rubber), a rigid material (e.g., plastic), or other suitable materials. The pretension door can be normally closed except when allowing the transport carriers 108 to pass through. In another embodiment, a divider 111 can include an actuated gate synchronized with the passing of the transport carriers 108 through the actuated gate. An example of the actuated gate is described below with reference to FIG. 4. In further embodiments, a divider 111 can include other suitable actuated or passive components and/or configurations.

The preheating section 102 is configured to receive one or more of the transport carriers 108 carrying items 101 to be sterilized or pasteurized. The transport carriers 108 are shown in FIG. 1 as each carrying three items 101 for illustration purposes. In other embodiments, the transport carriers 108 can carry two, four, five, six, or any other suitable number of items 101. In one embodiment, the transport carriers 108 may be received in batches. For example, the transport carriers 108 with the items 101 may be loaded into the preheating section 102 before sterilization or pasteurization processing is started and reloaded once the processing of a previous batch is finished. In other embodiments, the transport carriers 108 may be received in a continuous manner from, for example, a conveyer belt (not shown), a manual loading dock (not shown), and/or other suitable sources (not shown). In further embodiments, the transport carriers 108 may be received in semi-continuous or other suitable manners.

The preheating section 102 is also configured to homogenize temperatures of the received items 101 in the transport carriers 108 to a preheating temperature. In one embodiment, the preheating temperature can be about 60° C. In other embodiments, the preheating temperature can be 40° C., 50° C., or any other suitable temperatures. In the illustrated embodiment, the immersion fluid 110 supplied by the preheating fluid supply 132 is used to preheat and/or homogenize the temperatures of the items 101 to the preheating temperature. In other embodiments, steam, hot oil, and/or other thermal media may also be used.

In the illustrated embodiment, the preheating section 102 includes a carrier assembly 112 having an inlet 112a and an outlet 112b that is proximate to the first divider 111a. The carrier assembly 112 can include a vessel, tank, cartridge, or other suitable structures. In certain embodiments, the carrier assembly 112 can have a volume sufficient to provide a residence time such that temperatures of the items 101 in the transport carriers 108 can be at least generally homogenized when passing from the inlet 112a to the outlet 112b of the carrier assembly 112. In other embodiments, the carrier assembly 112 can also have other suitable volumes, structures, shapes, or components.

The carrier assembly 112 can also have a height H relative to the heating section 104 to exert a hydrostatic pressure on the items in the heating section 104. As discussed in more detail below, the hydrostatic pressure exerted on the individual items 101 may prevent or at least reduce the risk of steam explosion during heating in the heating section 104. In one embodiment, the height H can be about 5 meters. In other embodiments, the height H can be 4 meters, 6 meters, or any other suitable distances. In any of the foregoing embodiments, the height H may be adjusted based on at least one of (1) a desired heating temperature of the items 101, (2) a water content of the items 101, (3) a temperature of the immersion fluid 110 in the heating section 104, (4) power of microwave energy delivered to the items 101 in the heating section, or other suitable factors.

The carrier assembly 112 can also include a transport mechanism configured to transfer the individual transport carriers 108 to the heating section 104. As shown in FIG. 1, one example transport mechanism can include one or more rollers 122 proximate the outlet 112b of the carrier assembly 112. The one or more rollers 122 can be configured to carry one of the transport carriers 108 to the heating section 104 through the outlet 112b and via the first divider 111a. One example carrier assembly 112 having rollers 122 is described in more detail below with reference to FIG. 2.

In other embodiments, the rollers 122 may be omitted from the carrier assembly 112. Instead, the carrier assembly 112 may include mechanical movers, fluid jets, compressed gas, and/or other suitable transport mechanisms to transfer the individual transport carriers 108 from the preheating section 102 to the heating section 104. In further embodiments, the preheating section 102 can also include additional and/or different components. For example, the preheating section 102 may include two, three, or other suitable numbers of carrier assemblies (not shown) arranged in series, parallel, or in other suitable manners.

The heating section 102 is configured to apply microwave energy to the items 101 carried in the transport carriers 108 while the items 101 are immersed in the immersion fluid 110 and subject to a hydrostatic pressure of the immersion fluid 110. The applied microwave energy may be sufficient to raise a temperature (e.g., an interior temperature) of the items 101 to or above a target heating temperature sufficient to achieve sterilization or pasteurization. The interior temperature can be a center temperature or a temperature proximate to a central region of the individual items 101. In one embodiment, the target heating temperature can be about 90° C. In other embodiments, the target heating temperature can be 70° C., 80° C., 100° C. or other suitable temperature values.

The heating section 104 can include a transport unit 113 coupled to one or more microwave assemblies 114. The transport unit 113 can be configured to receive the transport carriers 108 carrying the items 101 from the preheating section 102. The transport unit 113 can also be configured to convey the received transport carriers 108 with the items 101 through the heating section 104 to be irradiated by microwave energy from the microwave assemblies 114 (indicated by arrows 117). As shown in FIG. 1, the transport unit 113 includes a transport housing 123, a plurality of rollers 122, and one or more microwave windows 125 in the transport housing 123. The microwave windows 125 can each include an opening with a microwave transmissive component (e.g., a glass or plastic plate). One example transport unit 113 is described in more detail below with reference to FIG. 3.

The microwave assemblies 114 are each configured to apply microwave energy to both sides of the items 101 simultaneously as the individual items 101 carried by the transport carriers 108 are moved through the transport unit 113. As shown in FIG. 1, each microwave assembly 114 includes two sets of a microwave source 116 coupled to a microwave guide 118 on opposite sides of the transport unit 113. The microwave source 116 can include a single-mode microwave source at a particular frequency (e.g., 950 MHz) or other suitable microwave sources. The microwave guide 118 can include a conical, trapezoidal, or other suitable shaped structure configured to direct the microwave energy 117 from the microwave sources 116 to the items 101 via the corresponding microwave windows 125 in the transport unit 113. In FIG. 1, two side-by-side microwave assemblies 114 are shown for illustration purposes. In other embodiments, the heating section 104 can include one, three, or any other suitable number of microwave assemblies 114. In further embodiments, the microwave assemblies 114 can be spaced apart from each other. In yet further embodiments, the microwave assemblies 114 may be in other suitable arrangements.

The optional holding section 105 can be configured to at least approximately maintain the interior temperature of the heated items 101 for a period of time (referred to as a holding time) to facilitate or effectuate sterilization or pasteurization. Without being bound by theory, it is believed that at least partial removal of certain microbiological organisms (e.g., bacteria) requires maintaining the temperature of the items 101 for a period of time. For example, milk may be pasteurized by heating milk to 72° C. for 15 seconds or 63° C. for 30 minutes. In one embodiment, the holding section 105 can include a holding tank 124 with a volume sufficient to provide a residence time that is equal to or above the holding time. The holding tank 124 can also include one or more rollers 122 configured to convey the transport carriers 108 to the cooling section 106. In other embodiments, the holding section 105 can include a holding tank with other suitable structures, volumes, and/or configurations. In the illustrated embodiment, the optional holding section 105 is shown as being at a lower elevation than the heating section 104. In other embodiments, the holding section 105 may be at the same elevation as or higher elevation then the heating section 104. In further embodiments, the holding section 105 may have other suitable arrangements relative to the heating section 104.

The cooling section 106 can be configured to reduce an overall temperature or interior temperature of the heated items 101 to room temperature (e.g., 15° C.) or other suitable temperatures for handling, transporting, and/or storage. As shown in FIG. 1, the cooling section 106 can include a transport vessel 126 with rollers 122 generally similar to the transport vessel 112 of the preheating section 102. In certain embodiments, the transport vessel 126 can have a volume to provide a sufficient residence time to reduce the overall or interior temperature of the items 101 from the heating section 104 and the optional holding section 105. In other embodiments, the transport vessel 126 may be configured to operate in a batch mode, and thus may have any suitable volumes.

In operation, the preheating section 102 receives the items 101 in the transport 108 and heat and/or homogenize temperatures of the items 101 with the immersion fluid 110 to the preheating temperature. The preheating section 102 may be operated in various modes. For example, in one embodiment, the preheating section 102 may be operated in batches. A plurality of transport carriers 108 with corresponding items 101 are initially received at the transport assembly 112. The preheating fluid supply 132 then provides water at a heating temperature (e.g., 80° C.) to heat and/or homogenize temperatures of the items 101 to the preheating temperature. Once the temperatures of the items 101 are generally homogenized, the transport mechanism (e.g., the rollers 122) can be activated to convey each transport carriers 108 to the heating section 104 via the first divider 111a.

In another embodiment, the preheating section 102 may be operated in a generally continuous mode. For example, the preheating fluid supply 132 can first establish circulation of the immersion fluid 110 at a temperature (e.g., 80° C.) in the transport assembly 112. Subsequently, the transport assembly 112 can receive the transport carriers 108 via the inlet 112a. As the transport carriers 108 travels from the inlet 112a toward the outlet 112b, the circulated water can heat and/or homogenize the temperatures of the items 101. Then, the transport mechanism (e.g., the rollers 122) can continuously convey the individual transport carriers 108 to the heating section 104 via the first divider 111a. In further embodiments, the preheating section 102 may be operated in other suitable manners.

The heating section 104 can then receive the items 101 with generally homogenized temperatures from the preheating section 102 and apply additional heat via microwave energy to the items 101. The tempered fluid supply 134 can initially establish a circulation of the immersion fluid 110 in the heating section 104 (and optional holding section 105). The transport unit 113 of the heating section 104 can then receive the transport carriers 108 with the items 101 via the first divider 111a. The rollers 122 in the transport unit 113 then conveys the individual transport carriers 108 to the optional holding section 105 along a direction (illustrated by arrow 127). As the items 101 in the immersion fluid 110 move past the microwave windows 125, the microwave sources 116 apply microwave energy to both sides of the items 101 to raise an interior temperature of the items 101 to the target heating temperature. Subsequently, the rollers 122 in the transport unit 113 can convey the heated items 101 in the transport carriers 108 to the optional holding section 105.

The optional holding section 105 can receive the items 101 heated to the target heating temperature from the heating section 104 and generally maintain the items 101 at that temperature for a period of time (e.g., 10 minutes). As discussed above, by maintaining the items 101 at or near the target heating temperature can reduce or remove microbiological organisms in the items 101. At the end of the period of time, the optional holding section 105 conveys the transport carriers 108 with the items 101 to the cooling section 106. The cooling section 106 then applies the immersion fluid 110 from the cooling fluid supply 136 at a cooling temperature (e.g., 15° C.) to reduce an overall or interior temperature of the items 101 to room temperature or other suitable temperatures. The cooled items 101 can then be unloaded from the cooling section 106 to be further processed and/or stored.

Several embodiments of the processing system 100 can be used to efficiently sterilize or pasteurize items 101 without or with reduced negative effects on the items 101 than conventional techniques. Unlike conventional techniques in which items 101 are heated by heating food products with hot air, hot water, or steam, items 101 are heated by microwave. As a result, interior temperatures of the items 101 can be more efficiently raised than conventional heating techniques.

Several embodiments of the processing system 100 can also be used to efficiently sterilize or pasteurize items 101 without requiring pressurization of the sections in the processing system 100. Instead, at least some sections of the processing system 100 may be open to atmosphere. As discussed above, the items 101, such as packaged food products, typically include a certain amount of water content. Thus, the applied microwave energy in the heating section 104 may generate steam that cause explosion or rupture of the packaged food products. In some other processing systems, the sections are pressurized, for example, with an inert gas or air to prevent such steam explosion. However, such pressurization requires the sections be designed as pressure vessels, and thus increasing the costs of manufacturing and installation as well as operating complexity. In contrast, several embodiments of the processing system 100 utilizes the a hydrostatic pressure of the immersing fluid 110 on the items 101 to prevent or at least reduce the risk of steam explosion during heating, and thus avoid the need to pressurize the sections. The immersion fluid 110 can also help to homogenize temperatures of the items during preheating, heating, and/or cooling.

Figure 2:
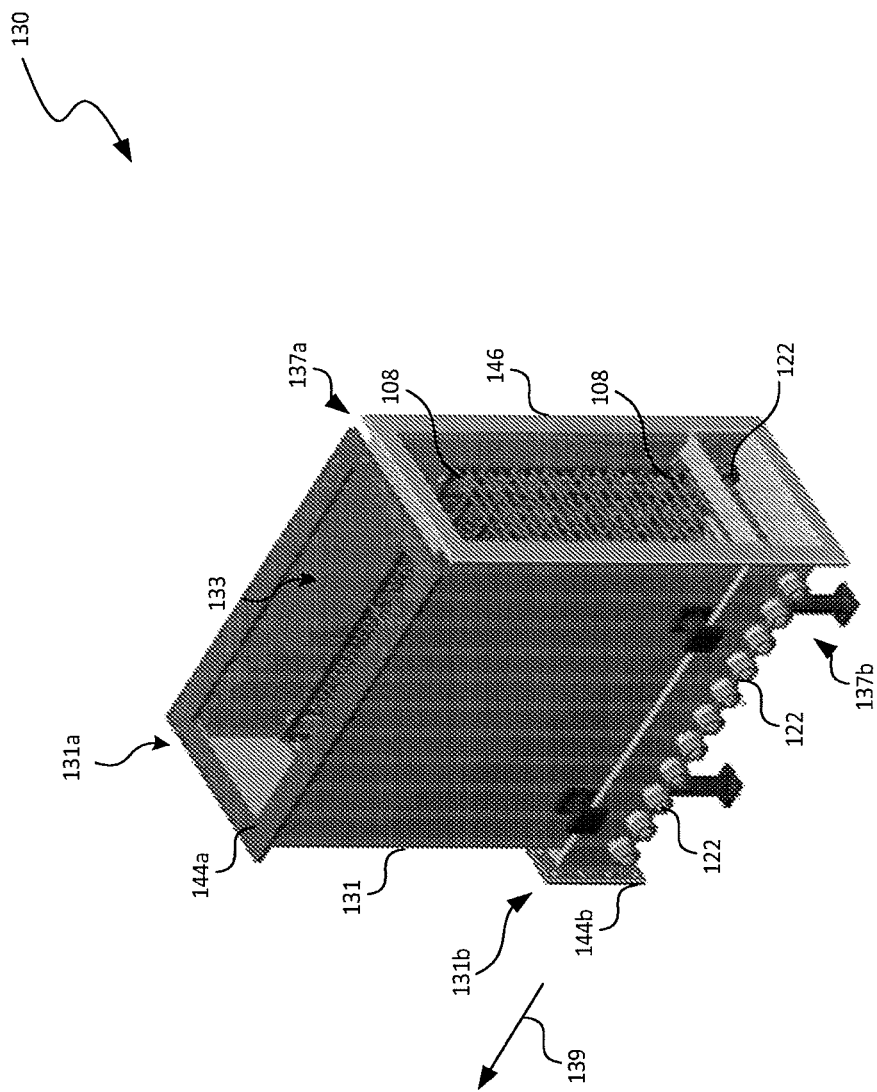
FIG. 2 is a perspective diagram illustrating a carrier assembly suitable for the processing system of FIG. 1 in accordance with embodiments of the disclosed technology.

FIG. 2 is a perspective diagram illustrating an example carrier assembly 130 suitable for the preheating section 102 or the cooling section 106 of the processing system 100 of FIG. 1 in accordance with embodiments of the disclosed technology. As shown in FIG. 2, the carrier assembly 130 can include a housing 131 having an inlet 131a with an inlet flange 144a and an outlet 131b with an outlet flange 144b. A back panel of the housing 131 is removed to show the transport carriers 108 for illustration purposes. In the illustrated embodiment, the housing 131 has a generally rectangular cross section between a first end 137a and a second end 137b. The inlet flange 144a and the outlet flange 144b are generally perpendicular to each other. In other embodiments, the carrier assembly 130 can have a trapezoidal, cylindrical, and/or other suitable cross sections sized and shaped to receive a plurality of transport carriers 108. In further embodiments, the carrier assembly 130 can also include friction fittings and/or other suitable couplers in addition to or in lieu of the inlet and/or outlet flanges 144a and 144b.

In the illustrated embodiment in FIG. 2, the carrier assembly 130 can include a plurality of rollers 122 proximate the second end 137b of the housing 131. The rollers 122 are configured to carry the bottom-most transport carrier 108 to exit the housing 131 via the outlet 131b, as indicated by an arrow 139. In one embodiment, the rollers 122 can be friction rollers. In other embodiments, the rollers 122 can include other suitable types of rollers. In further embodiments, the carrier assembly 130 can also include additional and/or different conveying components. For example, in certain embodiments, the carrier assembly 130 can also include a pneumatic push rods (not shown) proximate to the second end 137b of the housing 131 to carry the bottom-most transport carrier 108 to exit the housing 131 via the outlet 131b.

Though not shown in FIG. 2, the carrier assembly 130 can include a fluid inlet (e.g., a fluid distributer) and a fluid outlet (e.g., a nozzle) on the housing 131 to allow the immersion fluid 110 (FIG. 1) from the preheating fluid supply 132 (FIG. 1) or the cooling fluid supply 136 (FIG. 1) to circulate in an interior region 133 of the housing 131. The housing 131 can also include baffles, diverters, and/or other suitable flow modifying components configured to allow generally even flow of the immersion fluid 110 in the housing 131.

In operation, the carrier assembly 130 can receive a plurality of transport carriers 108 in a stack or other forms via the inlet 131a. The rollers 122 carries the bottom-most transport carrier 108 along the direction 139 to exit the outlet 131b. As the bottom-most transport carrier 108 exits the outlet 131b, another transport carrier 108 moves downward toward the second end 137b of the housing 131 to be carried through the outlet 131b. The process continues until no more transport carriers 108 are left in the housing 131.

Figure 3:
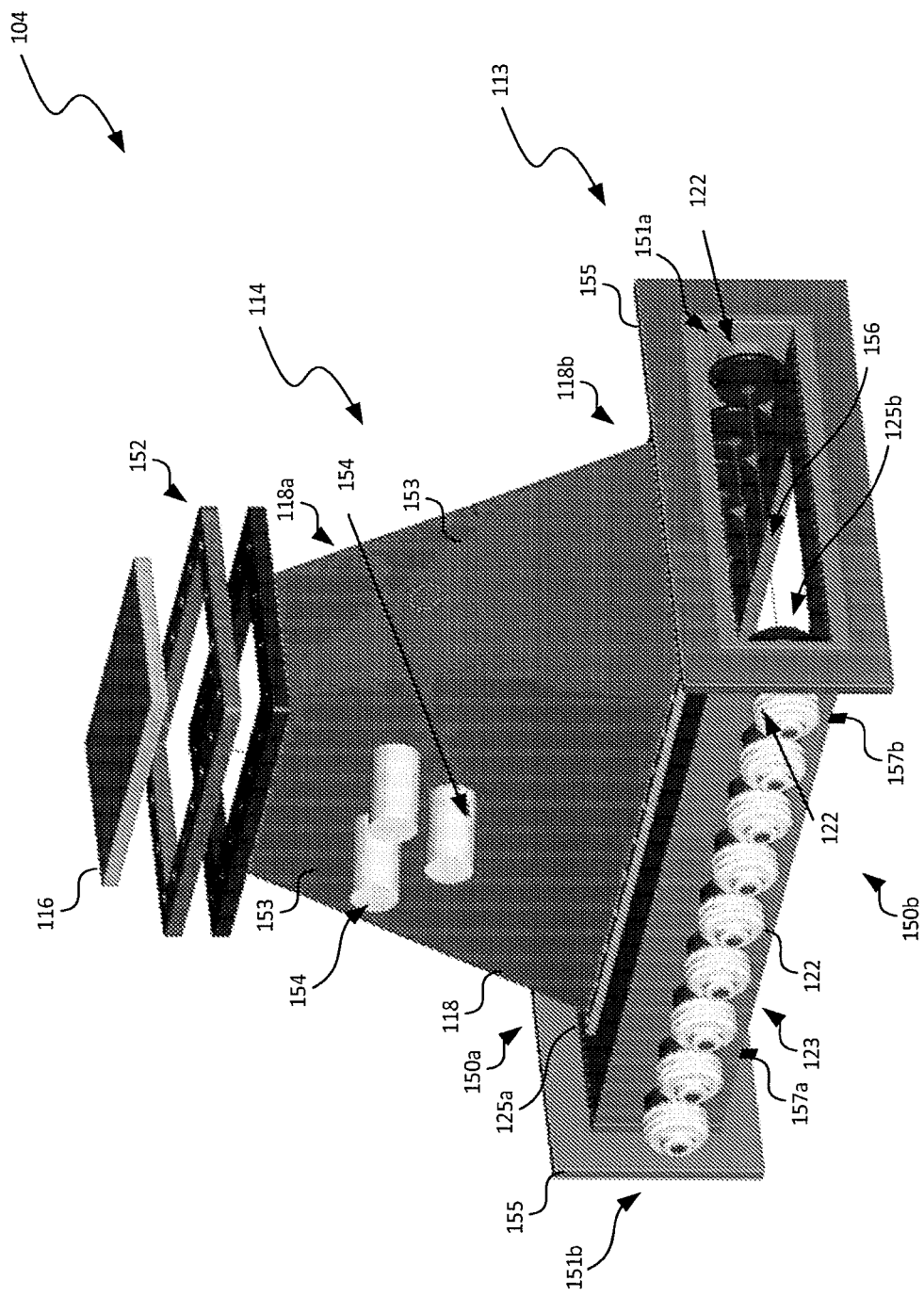
FIG. 3 is a perspective diagram illustrating a partial heating section suitable for the processing system of FIG. 1 in accordance with embodiments of the disclosed technology in accordance with embodiments of the disclosed technology.

FIG. 3 is a perspective diagram illustrating an example heating section 104 suitable for the processing system 100 of FIG. 1 in accordance with embodiments of the disclosed technology in accordance with embodiments of the disclosed technology. As shown in FIG. 3, the heating section 104 can include a microwave assembly 114 coupled to a transport unit 113. Even though only one microwave assembly is shown for clarity in FIG. 3, the heating section 104 can include an additional microwave assemblies 114 (FIG. 1) coupled to the transport unit 113. In other embodiments, the heating section 104 may include multiple additional microwave assemblies (not shown) in any suitable arrangements.

As shown in FIG. 3, the microwave assembly 114 can include a microwave source 116 coupled to a first end 118a of a microwave guide 118 via a set of flanges 152. As discussed above with reference to FIG. 1, the microwave source 116 can include a single-mode or other suitable types of a microwave generator. In the illustrated embodiment, a second end 118b of the microwave guide 118 is coupled to the microwave window 125a of the transport unit 113. The microwave guide 118 also includes four sidewalls 153 extending between the first end 118a and the second end 118b. Each of the sidewalls 153 has a generally trapezoidal shape. In other embodiments, the microwave guide 118 can also include other suitable structures with suitable shapes and sizes.

In the illustrated embodiment, the microwave assembly 118 also includes one or more microwave tuners 154 carried by one or more sidewalls 153 of the microwave guide 118. The microwave tuners 154 can be configured to adjust a load of microwave energy delivered from the microwave source 116 to the items 101 (FIG. 1) via the microwave window 125a. The microwave tuners 154 can include one or more mechanical slide-screw tuners, manual impedance tuners, automated impedance tuners, or other suitable types of microwave tuners. In other embodiments, the microwave tuners 154 may have other suitable placements on the microwave assembly 114 and/or the transport unit 113. In further embodiments, the microwave tuners 154 may be eliminated.

As shown in FIG. 3, the transport unit 113 includes a transport housing 123 with a plurality of rollers 122. In the illustrated embodiment, the transport housing 123 has a generally rectilinear shape with flanges 155 at a first end 151a and a second end 151b. The transport housing 123 has a microwave window 125a at a first side 150a and another microwave window 125b at the opposite second side 150b. In one embodiment, the first and second windows 125a and 125b may be generally aligned with each other. In other embodiments, the first and second windows 125a and 125b may be offset from each other or have other suitable arrangements. The rollers 122 are positioned side by side and proximate the second side 150b and thus forming a channel 156 through which the transport carriers 108 (FIG. 1) may be carried by the rollers 122 from the first end 151a to the second end 151b. In other embodiments, the transport unit 123 can also have other suitable structures, shapes, and sizes suitable to deliver microwave energy to the items 101 (FIG. 1) carried on the transport carriers 108.

As shown in FIG. 3, the carrier assembly 130 can include a fluid inlet 157a (e.g., a fluid distributer) and a fluid outlet 157b (e.g., a nozzle) on the transport housing 123 to allow the immersion fluid 110 (FIG. 1) from the tempered fluid supply 134 (FIG. 1) to circulate in the channel 156 of the transport housing 123. The transport housing 123 can also include baffles, diverters, and/or other suitable flow modifying components configured to allow generally even flow of the immersion fluid 110 in the transport housing 123.

In operation, individual transport carriers 108 carrying items 101 are received at the first end 151a of the transport housing 123 while the immersion fluid 110 from the tempered fluid supply 134 fills and circulates in the channel 156. The rollers 122 can then carry the individual transport carriers 108 from the first end 151a to the second end 151b. The items 101 can then receive microwave energy from the microwave source 116 while immersed in the immersion fluid 110 when the items 101 pass under/above the microwave windows 125a and 125b.

In one embodiment, when a transport carrier 108 is generally aligned with the microwave windows 125a and 125b, the rollers 122 may be stopped. The microwave source 116 may then be turned on to deliver microwave energy to the items 101 on the transport carrier 108 for a period of time (e.g., about 10 seconds to about 3 minutes). Subsequently, the rollers 122 are turned on to carry the transport carrier 108 toward the second end 151b. In another embodiment, the rollers 122 may be slowed but not stopped when the transport carrier 108 is at least partially exposed through the microwave windows 125a and 126b while the microwave source 116 is turned on to deliver microwave energy through the microwave windows 125a and 125b. In a further embodiment, the rollers 122 may carry the transport carriers 108 through the channel 156 at a constant speed. In yet further embodiments, the rollers 122 may carry the transport carriers 108 through the channel 156 in other suitable manners.

Figure 4:
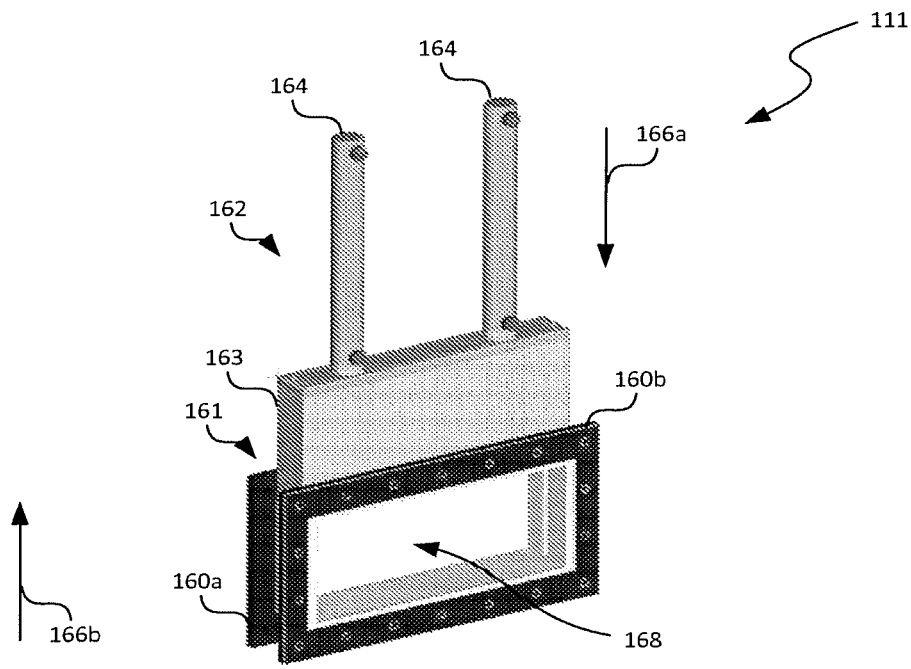
FIG. 4 is a perspective diagram illustrating an example divider suitable for the processing system of FIG. 1 in accordance with embodiments of the disclosed technology.

FIG. 4 is a perspective diagram illustrating an example divider 111 suitable for the processing system 100 of FIG. 1 in accordance with embodiments of the disclosed technology. As shown in FIG. 4, the divider 111 can include a pair of flanges 160a and 160b spaced apart from each other by a divider channel 161 and a gate 162 positioned in the divider channel 161. In the illustrated embodiment, the gate 162 includes a blocking member 163 attached to one or more lifting members 164 (two are shown for illustration purposes). The blocking member 163 can include a plate, slab, sheet, or other suitable structures constructed from a metal, alloy, plastic, rubber, or any other suitable materials with sufficient rigidity. In one embodiment, the lifting members 164 may be formed integral with the blocking member 163. In other embodiments, the lifting members 164 may be attached to the blocking member 163 with one or more fasteners, glue, or other suitable attachment mechanisms (not shown). Though not shown in FIG. 4, the divider 111 can also include seals, rails travel guides, and/or other suitable components attached on and/or formed in the flanges 160a and 160b and/or the gate 162.

In one mode of operation, the lifting members 164 may be actuated by an electrical motor, a pneumatic cylinder, and/or other suitable driving mechanisms (not shown) to push the blocking member 163 into the divider channel 161 between the flanges 160a and 160b, as indicated by arrow 166a. The blocking member 163 can thus at least partially isolate the immersion fluid 110 (FIG. 1) on either side of the flange 160a or 160b. In another mode of operation, the lifting members 164 may also be actuated to remove the blocking member 163 from the divider channel 161, as indicated by arrow 166b. As shown in FIG. 4, once the blocking member 163 is at least partially removed, a passage 168 forms through the flanges 160a and 160b allowing transport carriers 108 (FIG. 1) to pass through.

Figure 5A:
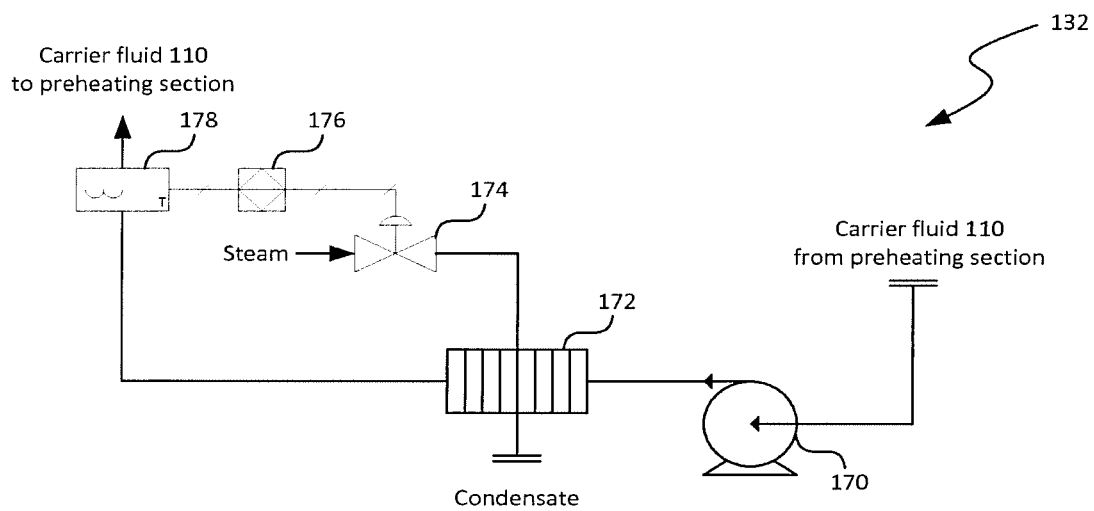
FIGS. 5A-5C are schematic diagrams of preheating, tempered, and cooling fluid supplies suitable for the preheating section, heating section, and cooling section of the processing system of FIG. 1, respectively, in accordance with embodiments of the disclosed technology.
Figure 5B:
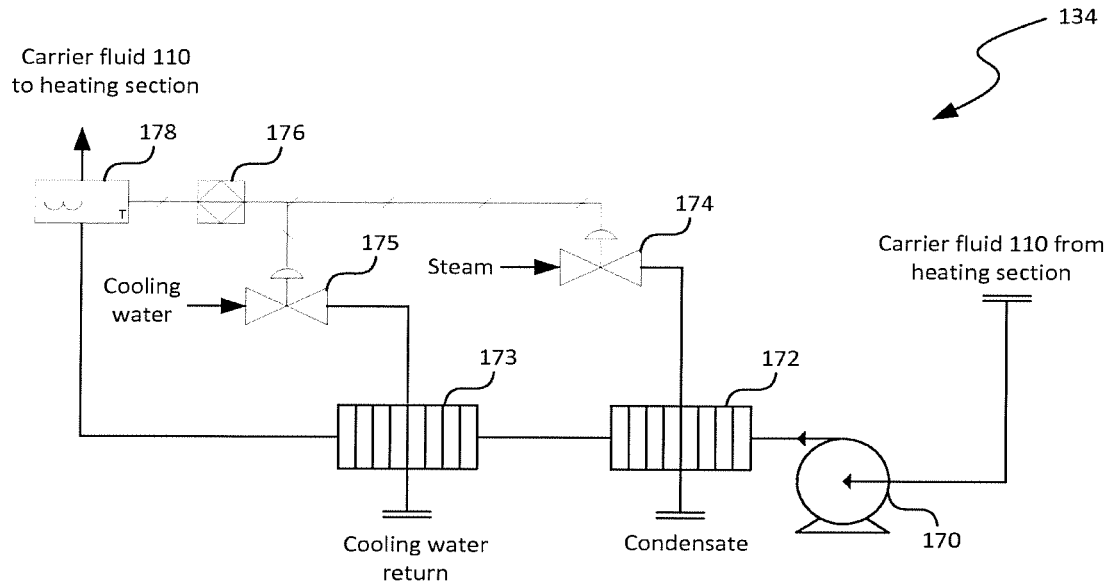
Figure 5C:
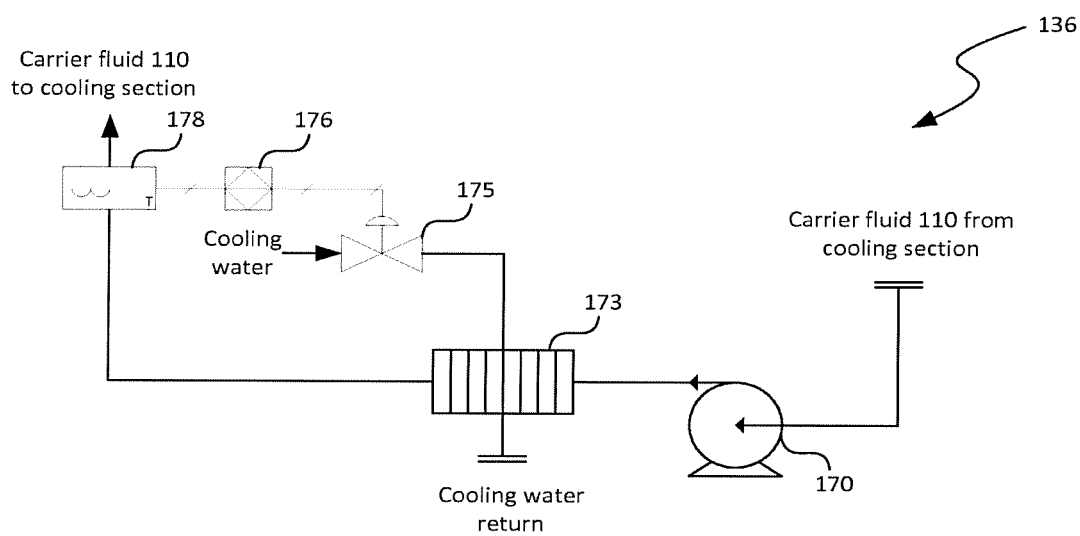

FIGS. 5A-5C are schematic diagrams of preheating, tempered, and cooling fluid supplies 132, 134, and 136 suitable for the preheating section 102, heating section 106, and cooling section 108 of the processing system 100 of FIG. 1, respectively, in accordance with embodiments of the disclosed technology. In FIGS. 5A-5C, identical reference numbers identify elements similar in structure and/or function. Even though particular components are shown in FIGS. 5A-5C, the fluid supplies 132, 134, and 136 may also include a flow meter, pressure gauge, pressure transmitter, valve position switches/transmitters, and/or other suitable components (not shown).

As shown in FIG. 5A, the preheating fluid supply 132 can include a circulating pump 170, a steam heat exchanger 172, a steam valve 174, a temperature sensor 178, and a controller 176 operatively coupled to one another. The circulating pump 170 can include a centrifugal pump, a gear pump, or other suitable types of pump. The steam heat exchanger 172 can include a plate-and-tube, plate, or other suitable types of heat exchanging component. The temperature sensor 178 can include a thermocouple, a resistance temperature detector, or other suitable types of temperature sensor. The steam valve 174 can include an actuated globe valve, butterfly valve, ball valve, or other suitable types of valve. The controller 176 can include a single-loop controller or a control module of a programmable process controller.

In operation, the circulating pump 170 receives the immersion fluid 110 from the preheating section 102 (FIG. 1) and moves the received immersion fluid 110 to the steam heat exchanger 172. Steam (e.g., 60 Psig steam) is introduced through the steam valve 174 to heat the immersion fluid 172 while the immersion fluid 172 passes through the steam heat exchanger 172. The temperature sensor 178 measures the temperature of the immersion fluid 110 exiting the steam heat exchanger 172 and provides the measurement to the controller 176. The controller 176 can then adjust the steam valve 174 based on a setpoint for the temperature of the immersion fluid 110 exiting the steam heat exchanger 172 and the measurements from the temperature sensor 178.

In the illustrated embodiment, the introduced steam is collected as condensate after passing through the heat exchanger 172. The collected condensate may then be recycled, drained, or otherwise processed. In other embodiments, the heat exchanger 172 may be substituted by a steam-water mixer (not shown) that is configured to directly mix the introduced steam with the immersion fluid 110.

As shown in FIG. 5B, the tempered fluid supply 134 can be generally similar to the preheating fluid supply 132 shown in FIG. 5A except having a cooling heat exchanger 173 in series with the steam heat exchanger 172 and a cooling water valve 175 configured to introduce cooling water to the cooling heat exchanger 173. Even though the cooling heat exchanger 173 is shown in FIG. 5B as downstream from the heat exchanger 172, in other embodiments, the cooling heat exchanger 173 can also be positioned upstream of the steam heat exchanger 172 or in other suitable places.

In operation, the controller 176 can adjust both the cooling water valve 175 and the steam valve 174 to achieve a setpoint for the temperature of the immersion fluid 110 to the heating section 104 (FIG. 1). For example, the controller 176 may be configured to perform split control according to which positive control actions are directed to the steam valve 174 while negative control actions are directed to the cooling water valve 173. Thus, the immersion fluid 110 may be heated by steam when passing through the steam heat exchanger 172 and cooled by cooling water when passing through the cooling heat exchange 173. In other examples, the controller 176 may also be configured to perform step control, threshold control, or other suitable control schemes.

As shown in FIG. 5C, the cooling fluid supply 136 can be generally similar to the tempered fluid supply 134 of FIG. 5B except the cooling fluid supply 136 does not include the steam heat exchanger 172 or the steam valve 174. In operation, the cooling water valve 175 admits cooling water to the cooling heat exchanger 173 to remove heat from the immersion fluid 110. The temperature sensor 178 measures the temperature of the immersion fluid 110 exiting the cooling heat exchanger 173 and provides the measurements to the controller 176. The controller 176 can then adjust the cooling water valve 175 based on a setpoint for the temperature of the immersion fluid 110 exiting the cooling heat exchanger 173 and the measurements from the temperature sensor 178.

Figure 6:
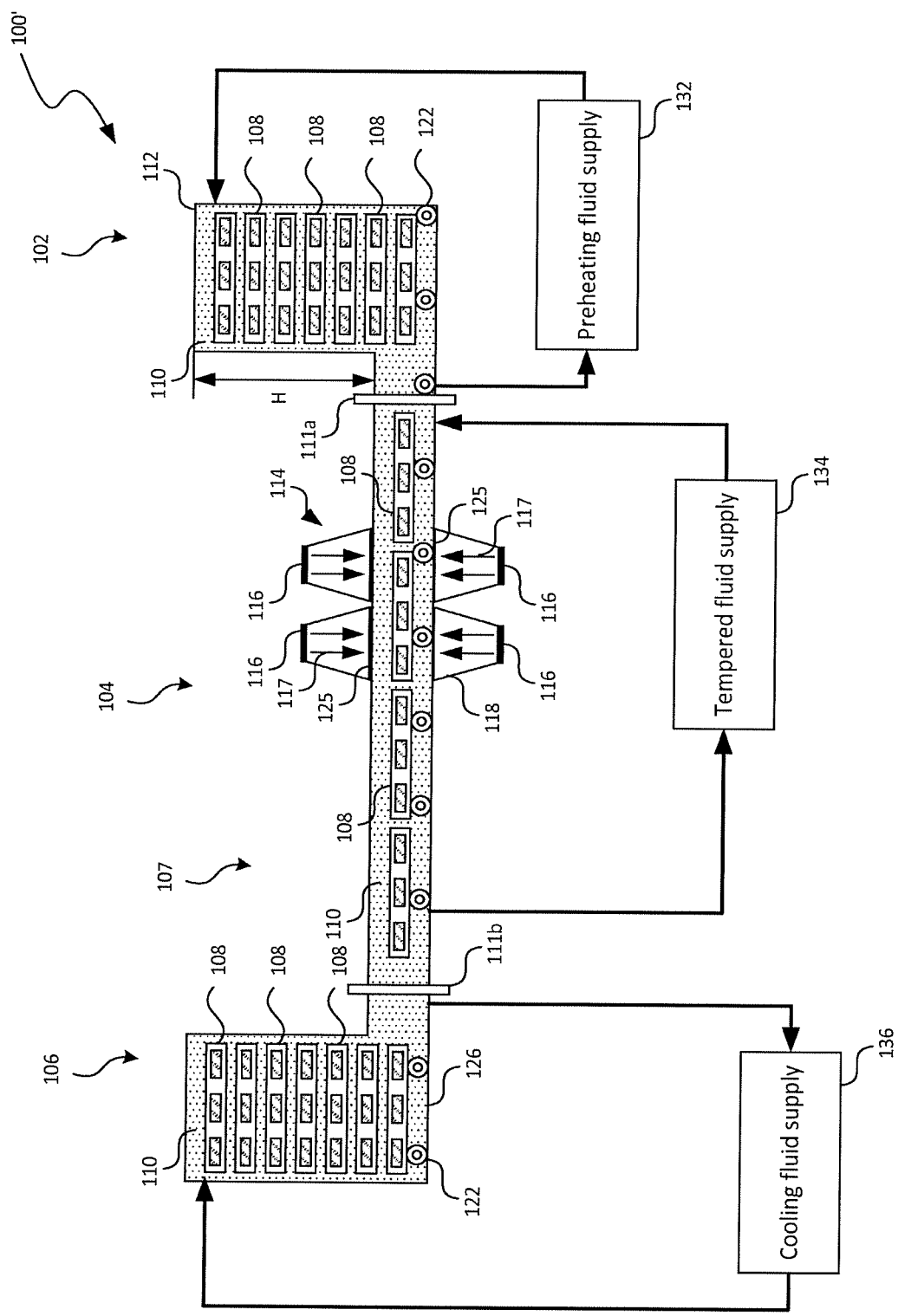
FIG. 6 is a schematic diagram illustrating another processing system useful for sterilization or pasteurization in accordance with embodiments of the disclosed technology.

FIG. 6 is a schematic diagram illustrating another processing system 100' useful for sterilization or pasteurization in accordance with embodiments of the disclosed technology. As shown in FIG. 6, the processing system 100' can be generally similar to that of FIG. 1 except that the preheating section 102 and the cooling section 106 can be at a generally similar elevation H with respect to the heating section 104. Also, the processing system 100' in FIG. 6 does not include the optional holding section 105. Instead, the processing system 100' includes a transport section 107 between the heating section 104 and the cooling section 106. The transport section 107 can be at an elevation generally similar to that of the heating section 104. In other embodiments, the transport section 107 may be omitted, and the heating section 104 may be coupled directly to the cooling section 106. In further embodiments, the processing system 100' may include other suitable components, assemblies, and sections in suitable arrangements.

Figure 7A:
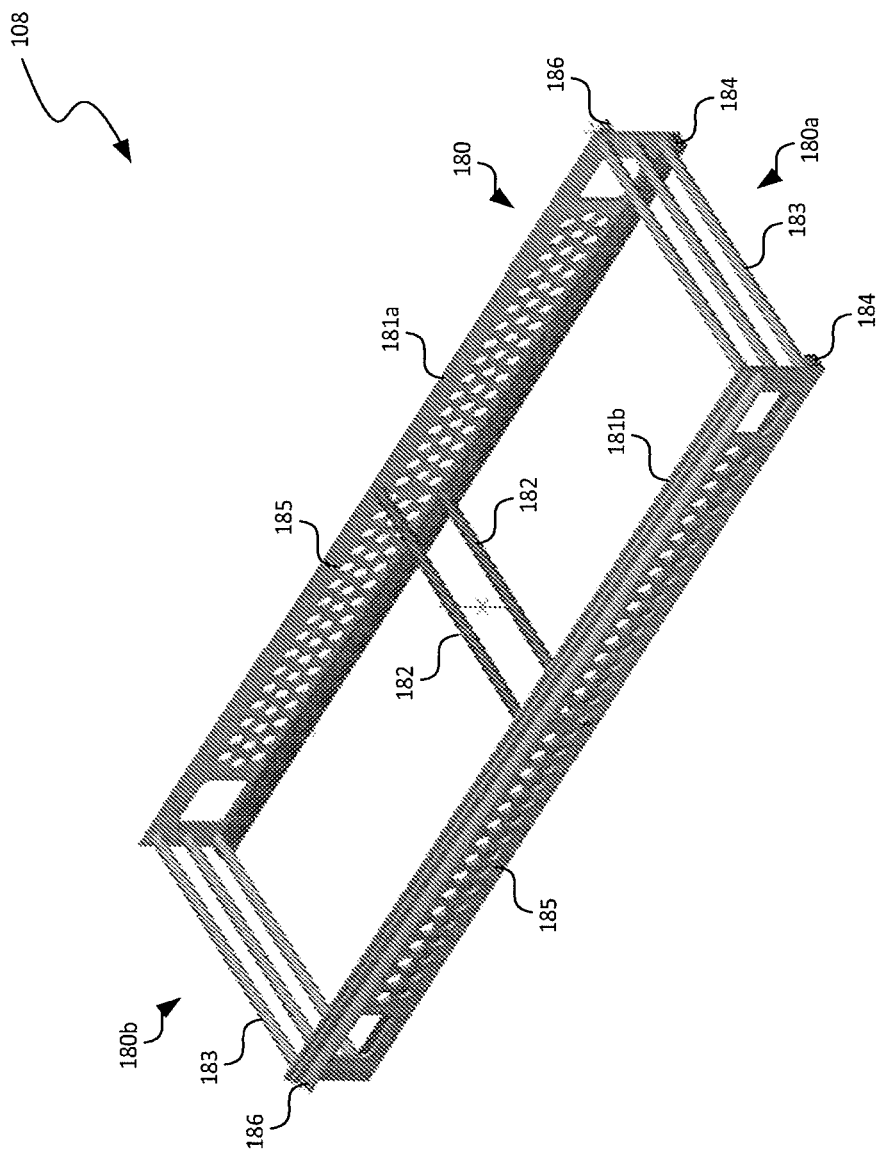
FIG. 7A is a perspective view of an example transport carrier suitable for the processing system of FIG. 1 in accordance with embodiments of the disclosed technology.

FIG. 7A is a perspective view of an example transport carrier 108 suitable for the processing system 100 of FIG. 1 in accordance with embodiments of the disclosed technology. As shown in FIG. 7A, the transport carrier 108 can include a carrier base 180 carrying one or more cross members 182. The carrier base 180 can have any suitable shape based on at least one of a shape or size of the items 101 (FIG. 1) to be carried thereon. For example, in the illustrated embodiment, the carrier base 180 has a generally rectilinear shape with a first side 181a and a second side 181b (collectively referred to as side or sides 181) extending between a first end 180a and a second end 180b of the base 180. In other embodiments, the carrier base 180 can have a generally oval, square, and/or other suitable shapes.

As shown in FIG. 7A, the first and second sides 181a and 181b each include a perforated plate 185 having a first support 184 and a second support 186 extending away from the perforated plate 185. The first support 184 extends toward an interior region of the carrier base 180, and the second support 186 extends in a direction opposite of the first support 184. Both the first and second supports 184 and 186 extend transversely between the first end 180a and the second end 180b. The first support 184 may be configured to support one or more items 101 carried in the transport carrier 108. The second support 186 may be configured to engage the rollers 122 (FIG. 1) or other suitable components of the processing system 100. The first and second ends 180a and 180b include one or more end bars 183 (three are shown at each end for illustration purposes). In other embodiments, the first and second ends 180a and 180b can include the cross members 182 instead.

The cross member 182 can include an elongated component extending between the first and second sides 181a and 181b. The cross member 182 can have a generally circular, rectangular, cubic, oval, or any other suitable cross-sectional are. In the illustrated embodiment, one pair of cross members 182 are shown for illustration purposes. In other embodiments, the carrier base 180 can carry two, three, four, or any suitable number of cross members 182 generally parallel to one another. In further embodiments, the carrier base 180 may carry one cross member 182 at a particular position between the first and second ends 180a and 180b instead of two cross members 182, as illustrated in FIG. 7A.

In any of the foregoing embodiments, various components of the carrier base 180 and the cross members 182 may be constructed from stainless steel, aluminum, plastics, or other suitable materials with sufficient mechanical strength. In one example, the first and second sides 181a and 181b and the first and second ends 180a and 180b may be constructed from stainless steel while the first supports 184 and the cross members 182 constructed from polyetherimide, polyether ether ketone, or other suitable plastic materials. In another example, the carrier base 180 and the cross members 182 can all be constructed from stainless steel or a plastic material. In further examples, the carrier base 180 and the cross members 182 may have other suitable combinations of construction materials.

In operation, the carrier base 180 can carry and support one, two, or any suitable number of items 101. For example, the items 101 may be fastened or otherwise attached to the cross members 182 and/or the first and second ends 180a and 180b using meshes, as discussed in more detail below with reference to FIG. 7B. In other embodiments, the items 101 may also be fastened or otherwise attached using clips, ropes, belts, hangers, and/or other suitable attachment mechanisms.

Even though the transport carrier 108 is illustrated in FIG. 7A as having particular components, in other embodiments, the transport carrier 108 can also include additional and/or different components in other suitable arrangements. For example, the carrier base 180 may also include a base member (e.g., a plate, a sheet, a mesh, etc. not shown) fastened to and/or supported on the first supports 184. In further embodiments, the transport carrier 108 may also include lateral members 188 (FIG. 7B), as discussed in more detail below with reference to FIGS. 7B and 7C.

Figure 7B:
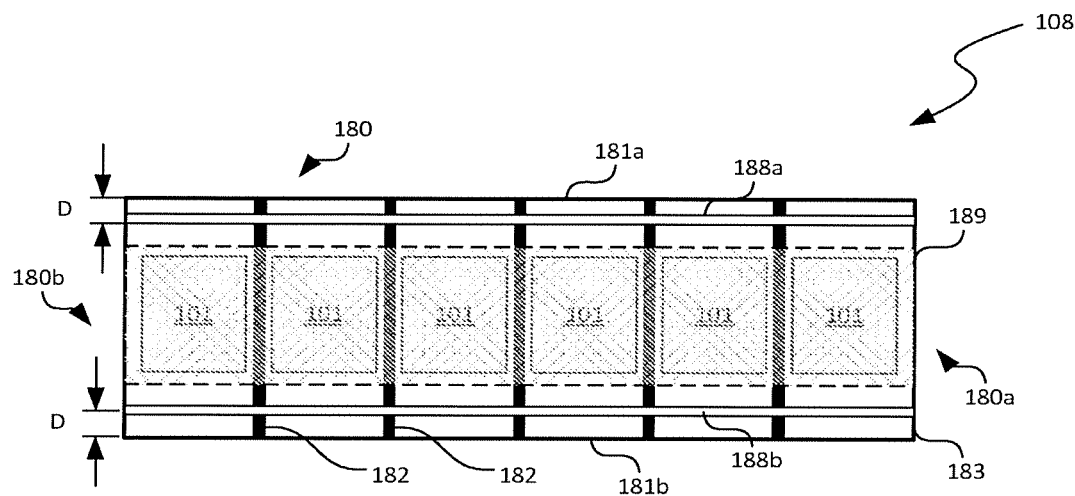
FIG. 7B is a top view of an example transport carrier having lateral members in accordance with embodiments of the disclosed technology.

FIG. 7B is a top view of a transport carrier 108 having lateral members in accordance with embodiments of the disclosed technology. As shown in FIG. 7B, the transport carrier 108 can include a first lateral member 188a proximate to the first side 181a and a second lateral member 188b proximate to the second side 181b. The first and second lateral members 188a and 188b extend transversely between the first end 180a and the second end 180b. In one embodiment, the lateral members 188a and 188b can be generally similar in shape and size as the first and second sides 181a and 181b, respectively. In other embodiments, the lateral members 188a and 188b can have other suitable shapes and sizes. In further embodiments, the lateral members 188a and 188b may have different shape and/or size from each other. One example lateral member 188 is discussed below with reference to FIG. 7C.

The first and second lateral members 188a and 188b may be movable and relocated relative to the first and second sides 181a and 181b, respectively. In the illustrated embodiment in FIG. 7B, the first lateral members 188a and 188b are shown as being spaced apart from the first and second sides 181a and 181b, respectively, by the same distance D. In other embodiments, the first and second lateral members 188a and 188b can be abutting the first and second sides 181a and 181b, respectively, abutting the items 101, or be at other suitable locations. In further embodiments, the first and second lateral members 188a and 188b may be spaced apart from the first and second sides 181a and 181b, respectively, at different distances (not shown).

As discussed in more detail below with reference to FIGS. 8A-8E, the inventors have recognized that certain structural features of the transport carrier 108 can influence a heating profile of the individual items 101. Such structural features can include material of construction of the cross members 182, position of the lateral members 188a and 188b, as well as material of construction of the lateral members 188a and 188b. As a result, a target heating profile may be achieved by (1) selecting a material of construction for the individual cross members 182 and/or lateral members 188a and 188b; and/or (2) adjusting a position of the individual lateral members 188a and 188b relative to the first and second sides 181a and 181b.

Also shown in FIG. 7B, the transport carrier 108 includes a mesh 189 hanging from, clipped on, or otherwise attached to the cross members 182 and/or the first and second ends 180a and 180b. The mesh 189 carries a plurality of the items 101. In the illustrated embodiment, the mesh 189 is shown as having double layers having the items 101 between the layers. In other embodiments, the mesh 189 can carry the items with one layer and/or in other suitable manners. One mesh product (#G-632896801) suitable for the mesh 189 is provided by Greenbelt Industries, Inc. of Buffalo, N.Y. As discussed above, in other embodiments, the transport carrier 108 may include other suitable components configured to carry the items 101.

Figure 7C:
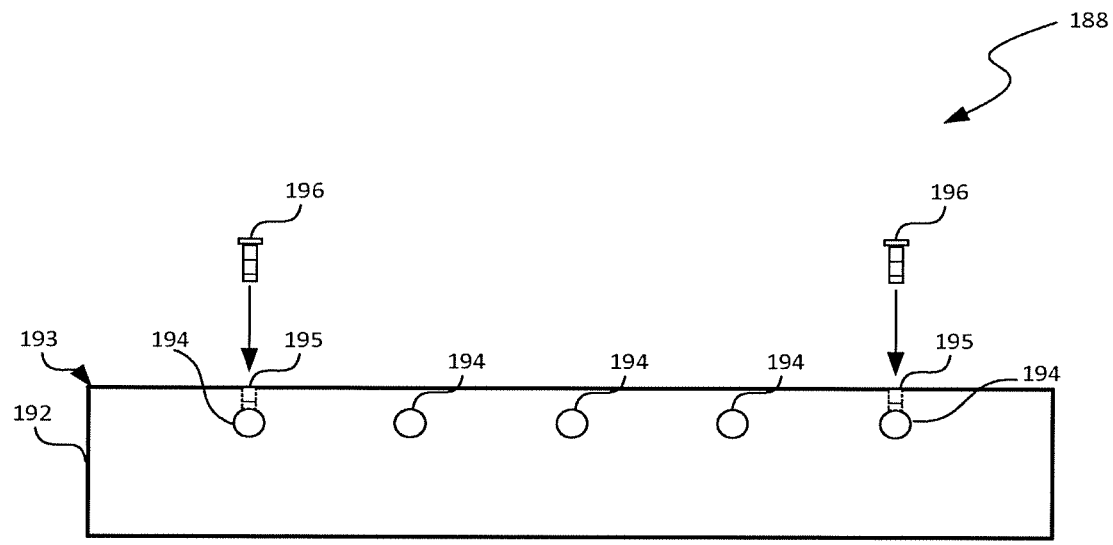
FIG. 7C is a side cross-sectional view of an example lateral member suitable for the transport carrier of FIG. 7B in accordance with embodiments of the disclosed technology.

FIG. 7C is a side cross-sectional view of an example lateral member 188 suitable for the transport carrier 108 of FIG. 7B in accordance with embodiments of the disclosed technology. As shown in FIG. 7C, the lateral member 188 can include a base 192 having a plurality of apertures 194. In the illustrated embodiment, the base 192 includes a generally rectangular plate. In other embodiments, the base 192 can also include a sheet, a bar, a cylinder, or other suitable structures in any suitable shapes. The apertures 194 can be shaped and sized to allow the cross members 182 (FIG. 7B) to pass through. Five apertures 194 are shown in FIG. 7C for illustration purposes. In other embodiments, the base 192 can include two, three, four, six, seven, or any other suitable numbers of apertures 194.

As shown in FIG. 7C, the base 192 can also include one or more openings 195 extending from an edge 193 of the base 192 to a corresponding aperture 194. In the illustrated embodiment, two openings 195 are shown for illustration purposes. In other embodiments, the base 192 can include one, three, or any other suitable number of openings 195. In certain embodiments, the openings 195 can be threaded to engage a positioning element 196 (e.g., a set screw, a pin, a compression fitting, etc.). In other embodiments, the openings 195 may be eliminated, and the base 192 may engage the cross members 182 via friction, spring (not shown), magnets, or other suitable engagement mechanisms.

As discussed above, the inventors have recognized that certain structural features of the transport carrier 108 can influence a heating profile of the individual items 101 upon application of microwave energy. Several tests were conducted to pasteurize items 101 having a simulated composition in a processing system generally similar to the processing system 100 of FIG. 1. The items 101 were carried in transport carriers 108 generally similar to that shown in FIGS. 7A-7C and immersed in water.

The simulated composition is configured to show observable effects in response to heating under various temperature conditions. In certain embodiments, the simulated composition can include a combination of the following components:

browning precursor(s);
a carrier;
a dielectric property modifier;
a viscosity modifier; and
water.

The browning precursors can include an amino acid (e.g., lysine, leucine, asparagine, glycine, etc.) and a reducing sugar (e.g., ribose, glucose, glyceraldehyde, galactose, etc.). The carrier can include a matrix material suitable to carry other components of the simulated composition. Example carriers can include potato, egg whites, and/or other suitable materials. The dielectric property modifier can include sucrose, salt, or other materials suitable for changing or influencing a dielectric characteristic of the simulated composition. The viscosity modifier can include Gellan gum, starches, vegetable gums, pectin, or other suitable thickener, emulsifier, or stabilizer of food compositions.

One example simulated composition used during testing include the following in weight percentages:

Gellan gum: 0.5-1.5% with about 0-10 mM calcium chloride;
Sucrose: 0-50%;
Sodium chloride: 0-300 mM;
D-ribose: 0.5-2%;
Lysine: 0.5-2%; and
Water: 42.6-98.5%.

The foregoing composition may be prepared by the following process:

Add Gellan gum to water and stir for about one hour at room temperature;
Heat the Gellan gum and water to about 90° C.;
Add a determined amount of calcium chloride based on a desired gel strength;
Stir at 90° C. for one minute and turn off heat;
Add ribose and lysine when mixture temperature is about 60° C.; and
Pour mixture to a tray.

Without being bound by theory, it is believed that when an amino acid (e.g., lysine) is heated with a reducing sugar (e.g., D-ribose), D-ribose reacts with lysine through enolization under weak acidic or neutral conditions to cause browning of the simulated composition. The degree of browning or color change is related to the temperature at which the reaction occurs. As a result, by observing the color change of the simulated composition, a heating profile may be derived. Example techniques for observing the color change can include color temperature measuring, light reflection measuring, and/or other suitable techniques.

Various components of the simulated composition can be adjusted to at least approximately match a target material (e.g., a food product) in physical characteristic. For example, an amount of calcium chloride may be adjusted to achieve a gel strength or firmness of the simulated composition based on a firmness of the target material. An amount of dielectric property modifier may be adjusted to at least approximately match the dielectric constant of the target material. An amount of the viscosity modifier may be adjusted to at least approximately match the viscosity of the target material. An amount of water may also be adjusted based on a water content or consistency of the target material.

Various embodiments of the simulated composition may be used for establishing and/or adjusting operating characteristics of the processing system 100 of FIG. 1 (or similar processing systems). For example, the simulated composition may be used to calibrate the transport carriers 108 when used in the processing system 100. In another example, the simulated composition may also be used to verify heating efficacy of the processing system 100, for example, by observing color changes after processing. In a further example, the simulated composition may also be used to determine a heating profile of the processing system 100 based on which the process may be adjusted to achieve a desired heating result.

Figure 8A:
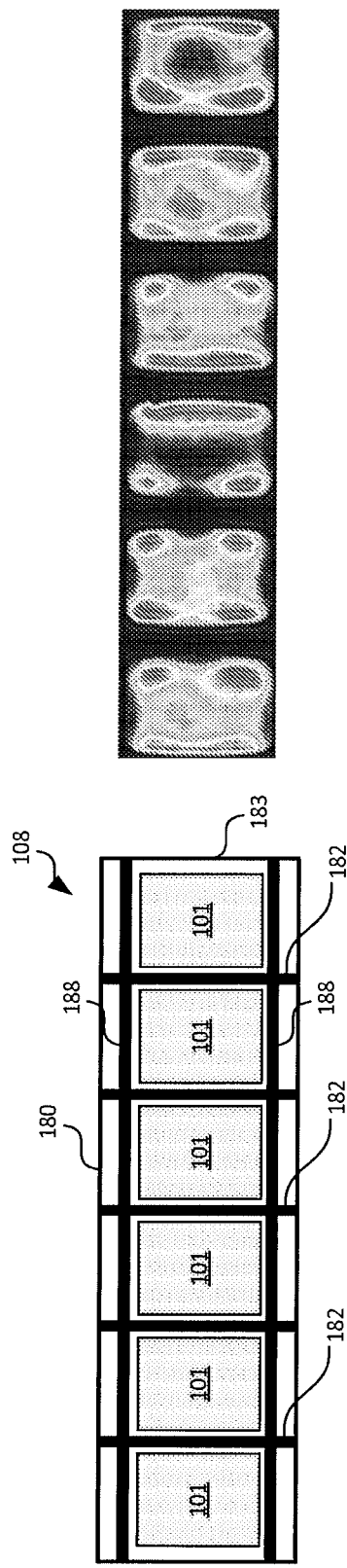
FIGS. 8A-8E are top views of carriers with various structural configurations and corresponding example heating profiles in accordance with embodiments of the disclosed technology.
Figure 8B:
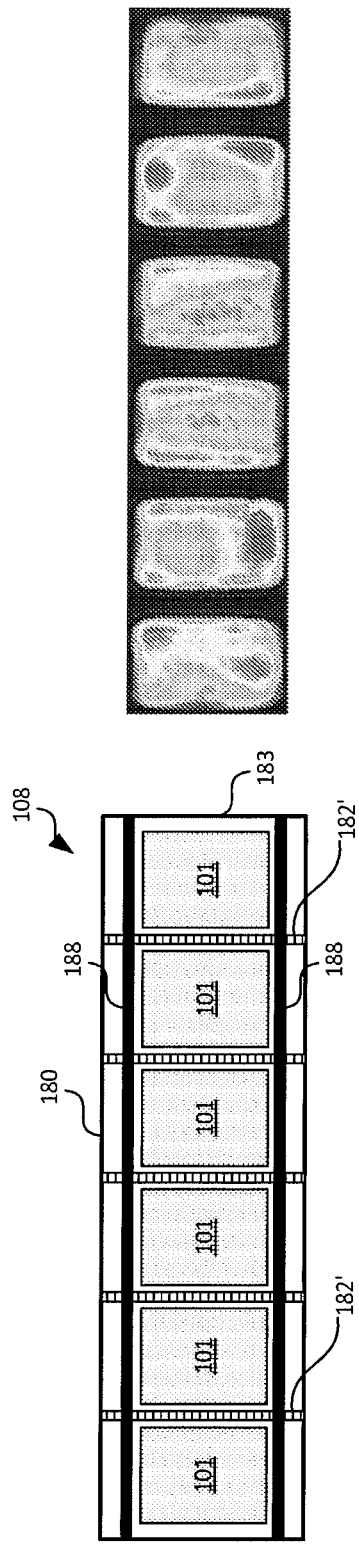
Figure 8C:
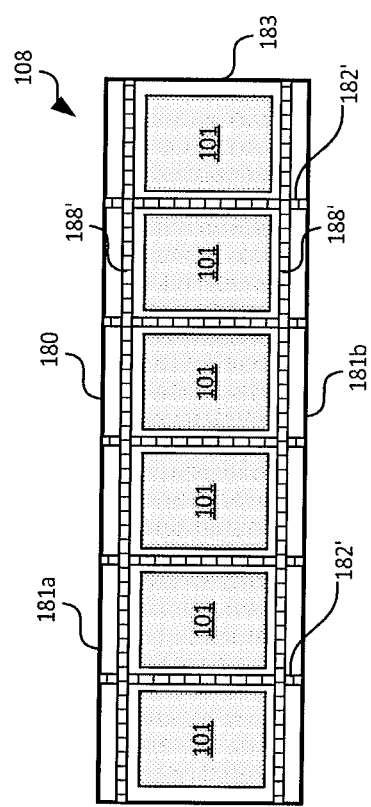
Figure 8D:
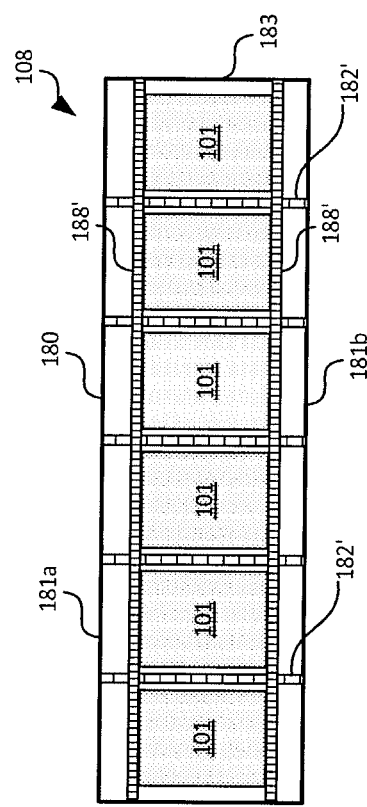
Figure 8E:
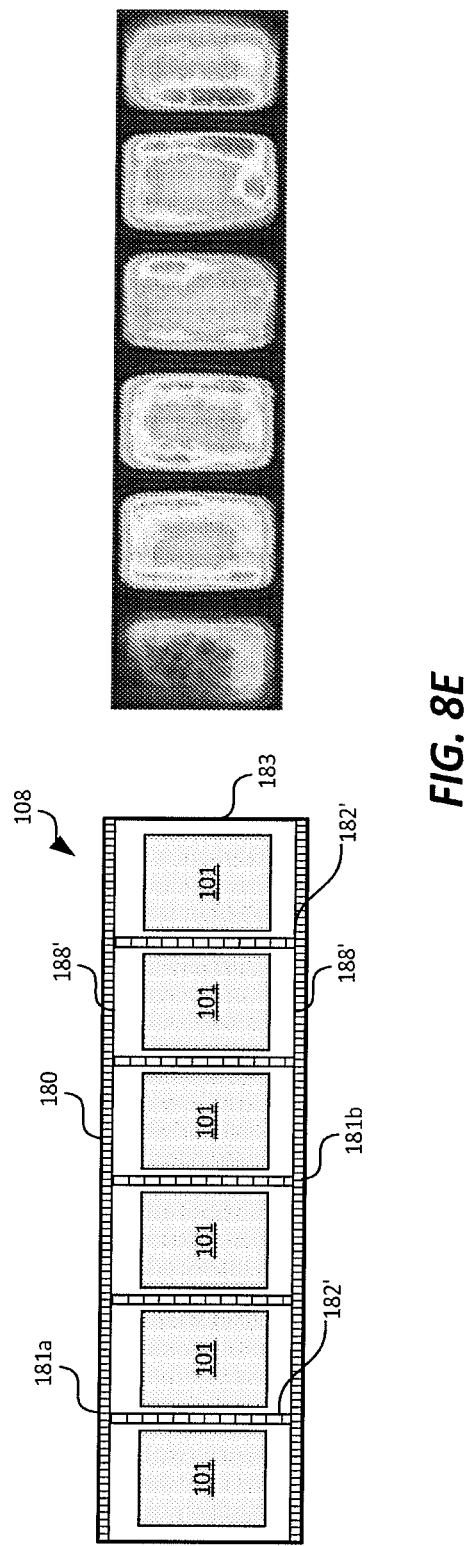

FIGS. 8A-8E show results of the tests in accordance with embodiments of the disclosed technology. In particular, FIGS. 8A-8E show top views of transport carriers 108 with various structural features and corresponding example heating profiles determined by observing the simulated composition. In particular, FIG. 8A shows a transport carrier 108 having a plurality of stainless steel cross members 182 and two stainless steel lateral members 188. FIG. 8B shows a transport carrier 108 having a plurality of polyetherimide cross members 182' and two stainless steel lateral members 188. FIG. 8C shows a transport carrier 108 having a plurality of polyetherimide cross members 182' and two polyetherimide lateral members 188' spaced apart from both the first and second sides 181a and 181b as well as the items 101. FIG. 8D shows a transport carrier 108 having a plurality of polyetherimide cross members 182' and two polyetherimide lateral members 188' spaced apart from the first and second sides 181a and 181b and abutting the items 101. FIG. 8E shows a transport carrier 108 having a plurality of polyetherimide cross members 182' and two polyetherimide lateral members 188' spaced apart from the items 101 but abutting the first and second sides 181a and 181b.

As clearly shown in FIGS. 8A-8E, the various structural features of the transport carriers 108 caused the temperature profiles of the items 101 to differ significantly. Without being bound by theory, it is believed that the structural features of the transport carrier 108 can affect microwave energy absorption or reflection at the items 101 (FIG. 1) by creating, modifying, or eliminating discontinuity in the immersion fluid 110 (FIG. 1) proximate the items 101. For example, the lateral members 188a and 188b (FIG. 7B) may create discontinuities in the immersion fluid 110 when microwave energy impacts the items 101 in the transport carrier 108. The discontinuities may affect formation of a standing wave on or around the individual items 101, and thus affect a percentage of absorption or reflection of the microwave energy.

Figure 9:
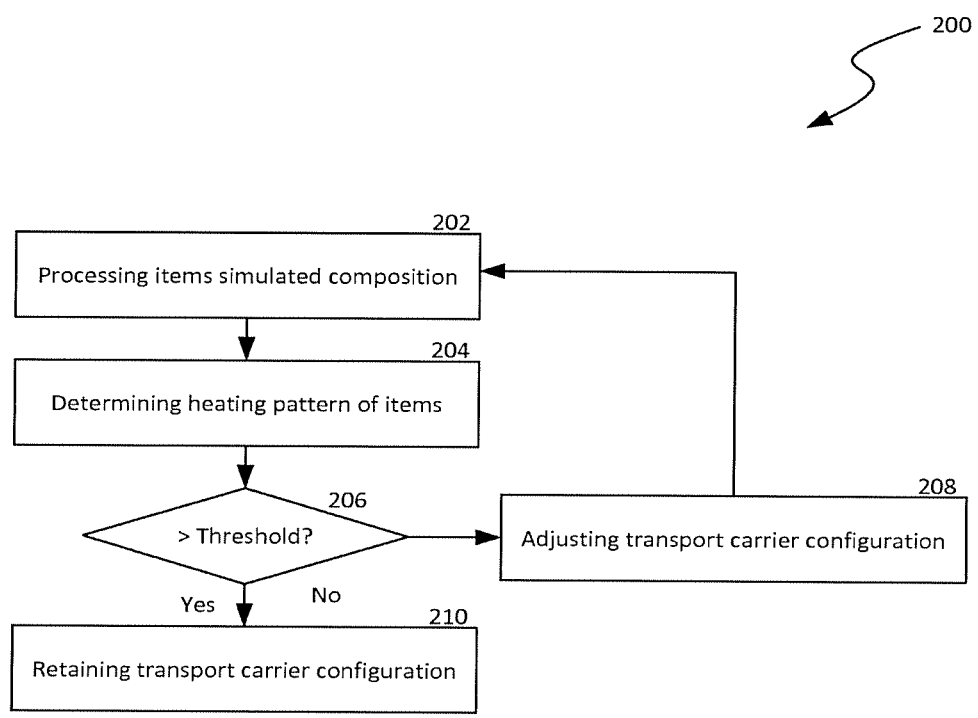
FIG. 9 is a flowchart illustrating a process of adjusting operation of a processing system of FIG. 1 for sterilization or pasteurization in accordance with embodiments of the disclosed technology.

Based on the foregoing recognition, a target heating profile may be achieved in the processing system 100 of FIG. 1 by (1) selecting a material of construction for the individual cross members and/or lateral members 188a and 188b; and/or (2) adjusting a position of the individual lateral members 188a and 188b. For example, FIG. 9 is a flowchart illustrating a process 200 of adjusting operation of a processing system 100 of FIG. 1 for sterilization or pasteurization in accordance with embodiments of the disclosed technology. As shown in FIG. 9, the process 200 can include processing items (e.g., food products) with a simulated composition configured to show observable effects in response to heating under various temperature conditions at stage 202. For example, in certain embodiments, processing the items can include processing the items in the processing system 100 of FIG. 1, the processing system 100' of FIG. 6, or other suitable processing systems. In other embodiments, processing the items can include heating the items with hot air, hot water, steam, or other suitable thermal media.

The process 200 can also include determining a heating pattern of the items with the simulated composition at stage 204. In one embodiment, the heating pattern can be determined by monitoring a color profile of the simulated composition in a sectional, layered, or another suitable manner. In other embodiments, the heating pattern can also be determined by monitoring a profile in viscosity, gelation, and/or other characteristics of the simulated composition. The process 200 can include a decision stage 206 to determine if the determined heating pattern is greater than a threshold.

In one embodiment, the threshold is a percentage of variation of the heating effects in the items. In other embodiments, the threshold can include other suitable values. In response to determining that the determined heating pattern is greater than the threshold, the process 200 can include retaining the transport carrier configuration at stage 210. In response to determining that the determined heating pattern is not greater than the threshold, the process 200 can include adjusting the transport carrier configuration at stage 208.

As discussed above, adjusting the transport carrier configuration can include at least one of (1) selecting a material of construction for the individual cross members 182 (FIG. 7B) and/or lateral members 188a and 188b (FIG. 7B); or (2) adjusting a position of the individual lateral members 188a and 188b. The process 200 then reverts to processing other items with simulated composition at stage 202. For example, in one embodiment, selecting a material of construction can include selecting between a metal (or metal alloy) material and a plastic material for the cross members 182 and/or lateral members 188a and 188b. In another example, selecting a material of construction can include selecting different material for the individual cross members 182 (or lateral members 188a and 188b). In other example, selecting a material of construction can include selecting between other suitable materials for at least one of the foregoing components of the transport carrier 108.

Figure 10:
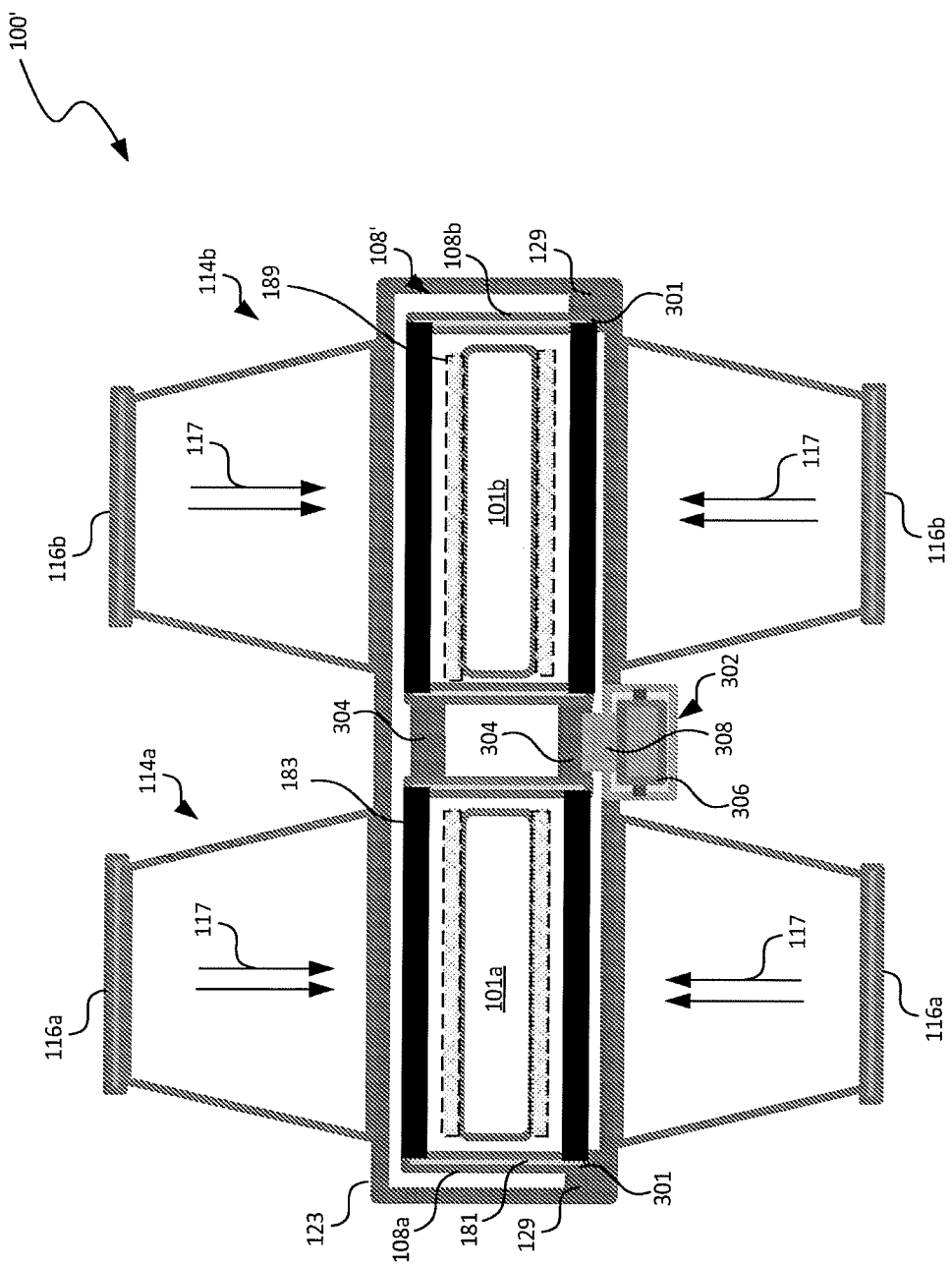
FIG. 10 is a schematic cross-sectional diagram illustrating another processing system useful for sterilization or pasteurization in accordance with embodiments of the disclosed technology.

Even though the transport carrier 108 is described with reference to FIGS. 7A-8E as being configured to carry one row of items 101, in other embodiments, the transport carrier 108 and the processing system 100 may be configured to carry and process two, three, or any suitable number of rows of items 101, respectively. For example, FIG. 10 shows a cross-sectional view of a processing system 100' that has a transport housing 123 configured to receive a transport carrier assembly 108' that includes first and second transport carriers 108a and 108b coupled together by one or more sets of connectors 304. The first and second transport carriers 108a and 108b can each include a mesh 189 configured to carry first and second rows of items 101a and 101b, respectively.

In one embodiment, the first and second transport carriers 108a and 108b can be generally similar in structure and function. For example, each of the first and second transport carriers 108a and 108b can be generally similar to the transport carrier 108 described above with reference to FIGS. 7A-7C. In other embodiments, the first and second transport carriers 108a and 108b can include additional and/or different components in other suitable configurations. In further embodiments, the first and second transport carriers 108a and 108b can have different configurations adapted to carry items 101 of different sizes, shapes, or other characteristics.

As shown in FIG. 10, in the illustrated embodiment, the processing system 100' can include two parallel microwave assemblies 114a and 114b each having two sets of microwave sources 116a and 116b. The microwave sources 116a and 116b are configured to deliver microwave energy 117 to the items 101a and 101b generally simultaneously via the corresponding microwave windows 125 (FIG. 1) in the transport housing 123. In other embodiments, the processing system 100' can also include three, four, or any suitable number of parallel sets of microwave assemblies 114 (not shown) configured to process transport carrier assemblies 108' having two, three, or any suitable number of transport carriers 108.

As shown in FIG. 10, in the illustrated embodiment, the transport mechanism of the processing system 100' can include a conveyor belt assembly 302 and one or more guide rails 129. In the illustrated embodiment, the conveyor belt assembly 302 includes a belt 306 driven by a motor (not shown) or other suitable types of actuators. The belt 306 can include a plurality of contactors 308 that extend from a surface of the belt 306 toward the transport assembly 108'. The contactors 308 are configured to be in contact with the connectors 304 when the belt 306 is moving in a direction along the transport housing 123. In operation, the carrier transport assembly 108' can have corners individually in contact with the guide rail 129. As the belt 306 moves in a direction into the transport housing 123, the contactors 308 can drive the carrier transport assembly 108' into the transport housing 123 along the guide rails 129. Examples of the belt 306 and the contactors 308 are described in more detail below with reference to FIGS. 11A and 11B. In other embodiments, the transport mechanism can also include rollers as shown in FIG. 1, guide slots, and/or other suitable components.

Figures 11A, 11B:
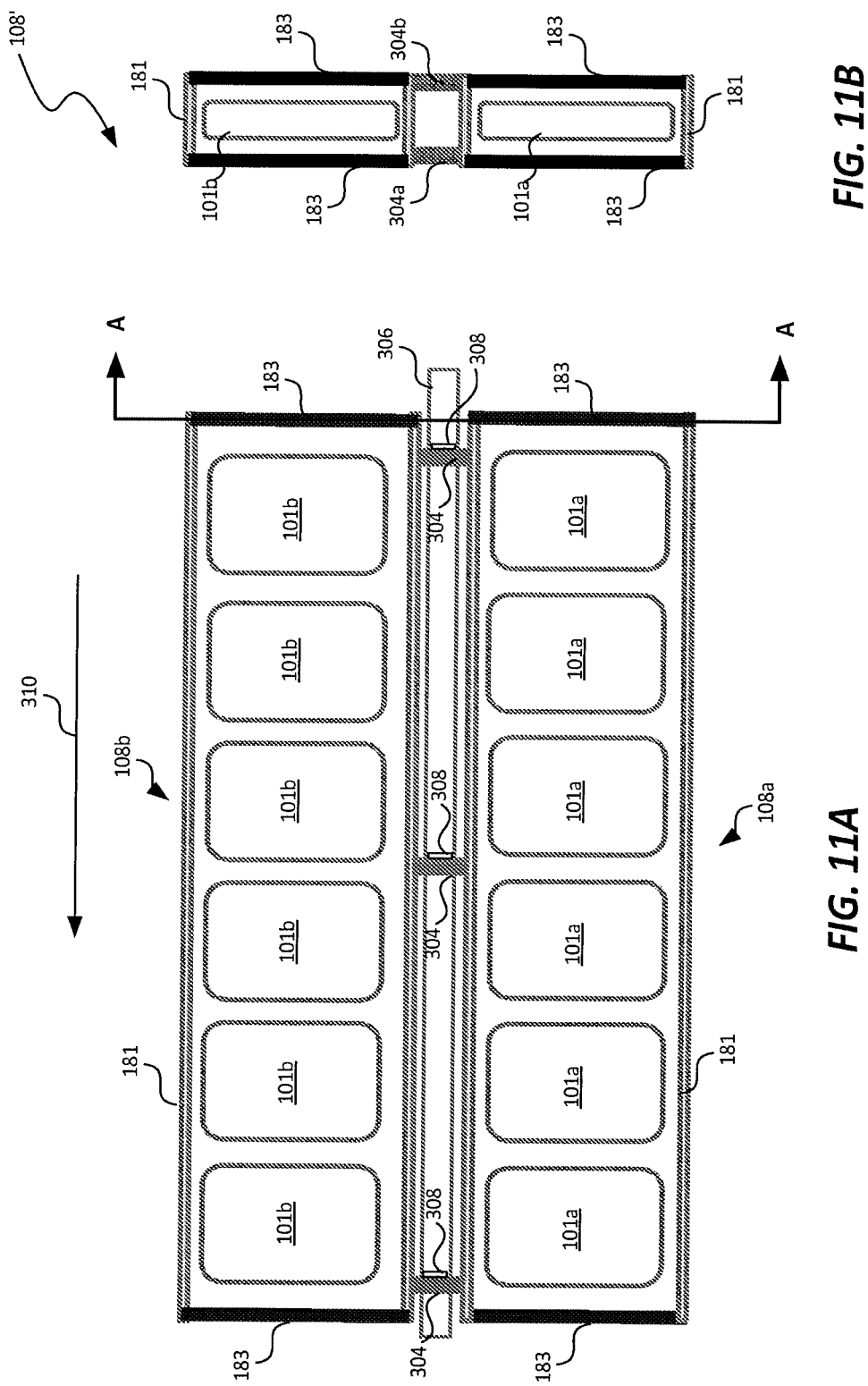
FIGS. 11A and 11B are schematic top and end views of a transport carrier assembly suitable for the processing system of FIG. 10.

FIG. 11A is a schematic top view of a transport carrier assembly 108' having two transport carriers suitable for the processing system of FIG. 10. FIG. 11B is a schematic end view of the transport carrier assembly 108' along lines A-A. In FIGS. 11A and 11B, the mesh 189 is omitted for clarity. As shown in FIGS. 11A and 11B, the transport carrier assembly 108' include first and second transport carrier 108a and 108b coupled together in parallel using three sets of connectors 304. Each set of connectors 304 includes two connecting rods 304a and 304b, which can be metallic, polymeric, or constructed with other suitable materials with sufficient mechanical properties. Each of the connecting rods 304a and 304b can be coupled to the sides 181 of the first and second transport carriers 108a and 108b via welding, threads, fasteners (e.g., nuts and bolts), and/or other suitable mechanisms. In other embodiments, the first and second transport carriers 108a and 108b can be coupled with other suitable number of sets of connectors 304 each having any suitable number of connectors.

Also shown in FIG. 11A, each of the connectors 304 can correspond to a contactor 308 of the conveyor belt 306. As discussed above, each of the contactors 308 are configured to be in contact with the connecting rods 304b of the connectors 304. In operation, as the conveyor belt 306 moves along the direction indicated by the arrow 310, each of the contactors 308 can drive the transport carrier assembly 108' along the same direction via the individual connecting rods 304b.

Several embodiments of the transport carrier assembly 108' can reduce or prevent microwave energy spillage in the transport housing 123 (FIG. 10). For example, during operation, the sides 181 (constructed from a metallic or other suitable material) of the first transport carriers 108a can reduce or prevent microwave energy 117 (FIG. 10) emitted from the microwave sources 116a (FIG. 10) to escape and spill over to the second transport carrier 108b, and vice versa. Controlling the flow of the emitted microwave energy 117 in such a manner can result in a generally uniform heating pattern and a generally consistent heating rate in the items 101a and 101b carried in the first and second transport carriers 108a and 108b, respectively.

Figure 12:
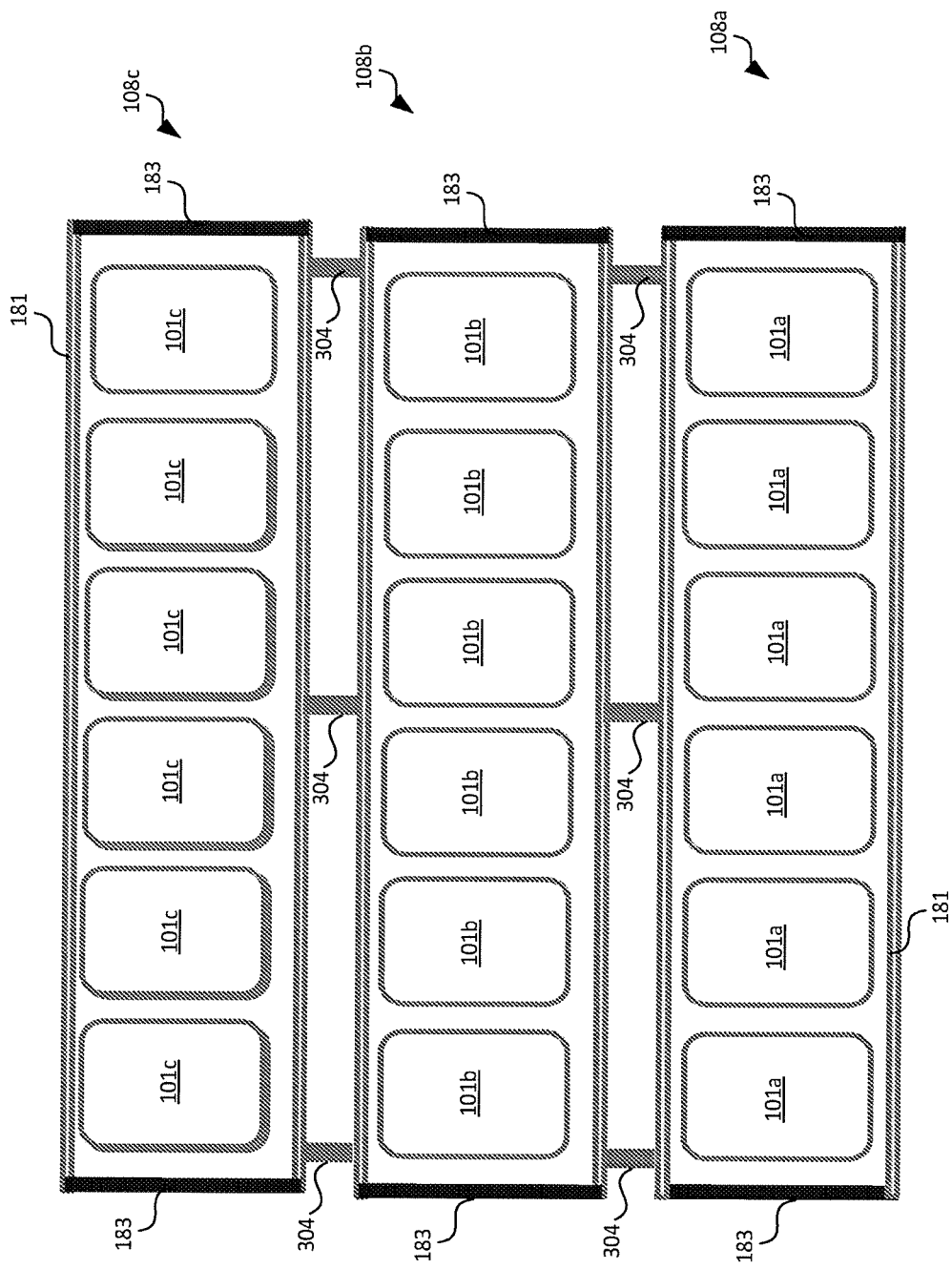
FIG. 12 is a schematic top view of another transport carrier assembly in accordance with embodiments of the disclosed technology.

FIG. 12 shows another transport carrier assembly 108' that includes first, second, and third transport carriers 108a-108c coupled in parallel using sets of connectors 304. In FIG. 12, the transport carriers 108a-108c can be generally similar to one another. In other embodiments, at least one of the transport carriers 108a-108c can be different in structure and/or function that other transport carriers 108a-108c. In further embodiments, the transport carrier assembly 108' can also include four, or any other suitable number of carrier assemblies 108 coupled in parallel via a suitable number of sets of connectors 304.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A sterilization and/or pasteurization system, comprising:
   a pre-heating section;
   a heating section;
   a post-heating section;
   openable and closeable dividers separating the pre-heating section from the heating section, and separating the heating section from the post-heating section; and
   a plurality of individual, separate transport carriers sized to pass through the openable and closeable dividers,
   wherein the pre-heating section is connected to the heating section, and the heating section is connected to the post-heating section, and each of the plurality of individual, separate transport carriers is configured to be
      placed in the pre-heating section,
      transported through the pre-heating section to the heating section,
      transported through the heating section to the post-heating section, and
      removed from the post-heating section,
   wherein the pre-heating section, the heating section, and the post-heating section each are filled or fillable with water,
   wherein each of the plurality of individual, separate transport carriers have a top and bottom, front and back, and left and right sides and define a space between the top and bottom, the front and back, and the left and right sides for holding one or more items to be sterilized or pasteurized by exposure to microwave emissions,
   wherein the heating section is constructed such that each of the plurality of individual, separate transport carriers are subjected to microwave emissions from one or more microwave emitters positioned above and/or below a transport pathway through the heating section through which the plurality of individual, separate transport carriers are passed sequentially with the front of one individual, separate transport carrier adjacent the rear of another individual, separate transport carrier,
   wherein each of the pre-heating section and the post-heating section are configured to accommodate several of the plurality of individual, separate transport carriers vertically one above the other with the top of one individual, separate transport carrier adjacent the bottom of another individual, separate transport carrier, and at least one of the pre-heating section and the post-heating section are configured to have a filled fluid level which has a vertical height above a top of the heating section, and
   wherein the dividers open and close to allow each of the plurality of individual, separate transport carriers to pass between the pre-heating section and heating section and between the heating section and post-heating section one at a time.

2. The system of claim 1 further comprising one or more heating controls which maintain a different water temperature in each of the pre-heating section, the heating section, and the post-heating section.

3. The system of claim 1 wherein the one or more microwave emitters emit at 915 MHz.

4. The system of any of claim 1 further comprising a holding section in the heating section, wherein the holding section is configured to accommodate several of the plurality of individual, separate transport carriers vertically one above the other.

5. The system of claim 1 wherein each of the one or more items to be sterilized is at a defined location in the space.

* * * * *